United States Patent [19]

Weigel

[11] 3,757,227

[45] Sept. 4, 1973

[54] COMBINED VHF-UHF TELEVISION TUNER

[75] Inventor: Morton L. Weigel, Bloomington, Ind.

[73] Assignee: Sarkes Tragian, Inc., Bloomington, Ind.

[22] Filed: July 2, 1971

[21] Appl. No.: 159,541

Related U.S. Application Data

[63] Continuation of Ser. No. 855,919, Sept. 5, 1969, , which is a continuation of Ser. No. 507,341, Nov. 12, 1965.

[52] U.S. Cl. .............................................. 325/462
[51] Int. Cl. .............................................. H04b 1/06
[58] Field of Search ........................... 325/462, 465; 334/55, 56; 178/DIG. 5

[56] References Cited

UNITED STATES PATENTS

| | | | |
|---|---|---|---|
| 1,671,519 | 5/1928 | Dubilier | 334/55 |
| 3,328,701 | 6/1967 | Rieth | 325/462 |
| 2,789,212 | 4/1957 | Achenbach et al. | 325/465 |

*Primary Examiner*—Richard Murray
*Attorney*—Richard D. Mason et al.

[57] ABSTRACT

A twenty-four position combined VHF-UHF television tuner is provided in which the tuner is operative in alternate ones of said twenty-four positions to receive different VHF stations and is operative in UHF positions between said alternate positions to receive signals from different groups of UHF television stations. When the station selector shaft is in any one of said UHF positions the VHF tuner portion is operated as an IF amplifier to amplify intermediate frequency signals produced by the UHF portion.

48 Claims, 26 Drawing Figures

INVENTOR
MORTON L. WEIGEL by Mason, Kolehmainen, Rathburn and Wyss
ATTORNEYS.

INVENTOR
MORTON L. WEIGEL
by Mason, Kolehmainen, Rathburn and Wyss
ATTORNEYS.

INVENTOR
MORTON L. WEIGEL
by
Mason, Kolehmainen, Rathburn and Wyss
ATTORNEYS.

INVENTOR
MORTON L. WEIGEL
by
Mason, Kolehmainen, Rathburn and Wyss
ATTORNEYS.

PATENTED SEP 4 1973

3,757,227

INVENTOR
MORTON L. WEIGEL
by
Mason, Kolehmainen, Rathburn and Wyss
ATTORNEYS.

INVENTOR
MORTON L. WEIGEL
by Mason, Kolehmainen, Rathburn and Wyss
ATTORNEYS.

INVENTOR
MORTON L. WEIGEL
by
Mason, Kolehmainen, Rathburn and Wyss
ATTORNEYS

INVENTOR
MORTON L. WEIGEL
by
Mason, Kolehmainen, Rathburn and Wyss
ATTORNEYS.

INVENTOR
MORTON L. WEIGEL
by Mason, Kolehmainen, Rathburn and Wyss
ATTORNEYS.

INVENTOR
MORTON L. WEIGEL
by
Mason, Kolehmainen, Rathburn and Wyss
ATTORNEYS.

INVENTOR
MORTON L. WEIGEL by Mason, Kolehmainen, Rathburn and Wyss
ATTORNEYS.

COMBINED VHF-UHF TELEVISION TUNER

The present application is a continuation of my copending continuation application Ser. No. 855,919, filed Sept. 5, 1969 under the Commissioner's Order 824 O.G. 1, said application Ser. No. 855,919 itself being a continuation of earlier copending parent application Ser. No. 507,341 filed Nov. 12, 1965, all of which applications are assigned to the same assignee.

The present invention relates to television tuners, and, more particularly, to a television tuner arrangement for receiving both VHF television signals and UHF television signals from any of the VHF or UHF television stations in a given area of reception.

Over the past 20 to 25 years, the design concepts for television tuners which are capable of receiving the twelve VHF television stations (Channels Nos. 2 to 13, inclusive) have become quite standardized. Thus, while certain differences in circuit design may exist, the ordinary VHF television tuner, whether of the switch type or of the turret type, employs a channel selector shaft having twelve mechanical detents which establish twelve fixed and distinct VHF channel positions for the selector shaft. A fine tuning shaft is provided concentric with the station selector shaft and is employed as a common vernier tuning element for precisely tuning in any one of the twelve VHF television stations which is selected by adjustment of the channel selector shaft to a particular position. In contradistinction to the mechanically detented channel selector shaft, the so-called fine tuning shaft is usually continuously variable.

In many of the conventional VHF television tuners, a so-called memory fine tuning arrangement is also provided whereby the adjustment of the fine tuning shaft for precise tuning to any one of the VHF stations need only be made initially and thereafter the fine tuning adjustment position is "memorized". Accordingly, in a VHF television tuner provided with memory fine tuning, once the initial fine tuning adjustment has been made for each VHF television channel in the area, it is only necessary to rotate the channel selector shaft to the desired VHF channel position, and no further adjustment on the part of the user is required.

The UHF band of television stations was opened up by the Federal Communications Commission some twelve to fourteen years ago and as a result some seventy additional UHF television stations (Channels Nos. 14 to 83, inclusive) were made available for commercial television broadcasting purposes. In allocating these seventy UHF channels to various areas of reception over the country, the Federal Communications Commission has followed the policy of spacing the UHF television stations in a given reception area quite far apart in the UHF frequency band. Thus, in a given reception area the different UHF television stations are allocated to channels which are spaced apart by six intervening and unused UHF channels. This means that only a total of 12 UHF channels are presently available in any given reception area.

Recent legislation has required that all television receivers include provisions for receiving the 70 UHF channels as well as the 12 VHF channels. While many arrangements have been heretofore proposed for the combined reception of VHF and UHF television signals, none of these arrangements have achieved the simplicity in tuning of the conventional VHF only television tuner. In general, these combined VHF-UHF arrangements have required additional shafts and dial arrangements, and in some instances have been quite bulky and cumbersome mechanically and extremely complicated from the electrical design standpoint.

Furthermore, due to the complicated design of these VHF-UHF tuner arrangements, they have not been particularly suited for memory fine tuning or other features now widely accepted in VHF only tuners, such as remote control tuning whereby a push button arrangement may be employed for remotely tuning to a desired station.

It is, therefore, an object of the present invention to provide a combined VHF-UHF television tuner wherein one or more of the disadvantages of the prior art arrangements are avoided.

It is another object of the present invention to provide a new and improved VHF-UHF tuner which is similar in operation and ease of adjustment to the conventional VHF only television tuner.

It is a further object of the present invention to provide a new and improved VHF-UHF television tuner wherein any VHF or UHF television station within a given reception area may be selected simply by adjustment of a common channel selector shaft.

It is a still further object of the present invention to provide a new and improved VHF-UHF television tuner wherein a common channel selector shaft is provided with 24 mechanically detented positions, 12 of which positions are employed for the reception of VHF television channels and the other 12 positions being employed for the reception of UHF television channels.

It is still another object of the present invention to provide a new and improved VHF-UHF television tuner arrangement wherein a common channel selector shaft is employed for the selection of both VHF and UHF stations and the positions assigned to UHF stations are interposed between the positions assigned to the different VHF television stations.

Another object of the present invention resides in the provision of a new and improved VHF-UHF television tuner arrangement wherein any one of the VHF and UHF television stations in a given reception area may be selected by adjustment of a common channel selector shaft and without requiring further adjustments on the part of the user.

A further object of the present invention resides in the provision of a new and improved VHF-UHF television tuner wherein a precise or fine tuning adjustment is provided for both VHF and UHF stations by means of a common control member.

A still further object of the present invention resides in the provision of a new and improved VHF-UHF television tuner where a tuning function equivalent to the memory fine tuning arrangement provided on VHF only television tuners is also provided for UHF television channels.

It is another object of the present invention to provide a new and improved VHF-UHF television tuner arrangement which is particularly suitable for the remote control selection of VHF and UHF television stations.

It is a further object of the present invention to provide a new and improved VHF-UHF television tuner wherein a common channel selector shaft is provided for both VHF and UHF channels which is readily adapted to be driven by a motor for remote control operation of the tuner.

It is another object of the present invention to provide a new and improved VHF-UHF television tuner arrangement wherein a group of UHF television channels may be selected by adjustment of a mechanically-detented channel selector shaft and a desired UHF station within the selected band may be selected by means of a continuously variable drive arrangement for the main UHF tuning shaft.

It is a still further object of the present invention to provide a new and improved VHF-UHF television tuner wherein a common channel selector shaft is provided which has alternate shaft positions for 12 VHF and 12 UHF television stations and the VHF tuner portion is operated as an IF amplifier when the channel selector shaft is in any one of the UHF station positions thereof.

It is a further object of the present invention to provide a new and improved VHF-UHF television tuner wherein the VHF tuner portion is operated as an IF amplifier during UHF reception and the band pass characteristic of the tuning circuits used for the reception of VHF channels is substantially improved.

It is another object of the present invention to provide a new and improved VHF-UHF television tuner capable of receiving any VHF or UHF television station within a given reception area, which is of simple and economical construction, is reliable in operation and may be readily manufactured on a mass production basis at low cost.

Briefly, in accordance with one aspect of the present invention, the channel selector shaft of the combined VHF-UHF tuner is provided with 24 detent positions. Twelve of these positions, which are spaced 30° apart, are assigned to the 12 VHF channels. The intermediate 12 positions, which are also spaced 30° apart but which are displaced 15° from the VHF channel positions, are assigned to receive twelve UHF televison bands. Each of these UHF television bands is approximately six UHF channels wide and under present FCC allocations only one UHF station will be present within each of these UHF bands in any given reception area.

A common concentric fine tuning knob is provided, rotation of which is effective to provide fine tuning for the VHF channels and precise tuning to a particular UHF station within each of the UHF television bands selected by the channel selector shaft. In addition, an arrangement is provided for maintaining the fine tuning or precise tuning for each VHF or UHF channel once it has been made so that a type of operation equivalent to memory fine tuning provided on VHF only television tuners is provided for both VHF and UHF stations.

In the UHF station positions of the common channel selector shaft the VHF tuner position is operated as an IF amplifier for the output signal from the UHF tuner portion and facilities are provided for controlling the UHF tuner portion so that tuning may be readily switched from VHF channels to UHF channels as the channel selector shaft is rotated. A motor drive arrangement is provided for the common channel selector shaft which may be readily controlled to provide remote control operation for both VHF and UHF channels in a manner similar to that now provided in VHF only television tuners.

The invention, both as to its organization and method of operation, together with further objects and advantages thereof, will best be understood by reference to the following specification taken in connection with the accompanying drawings in which.

Figures 1, 2, 3:
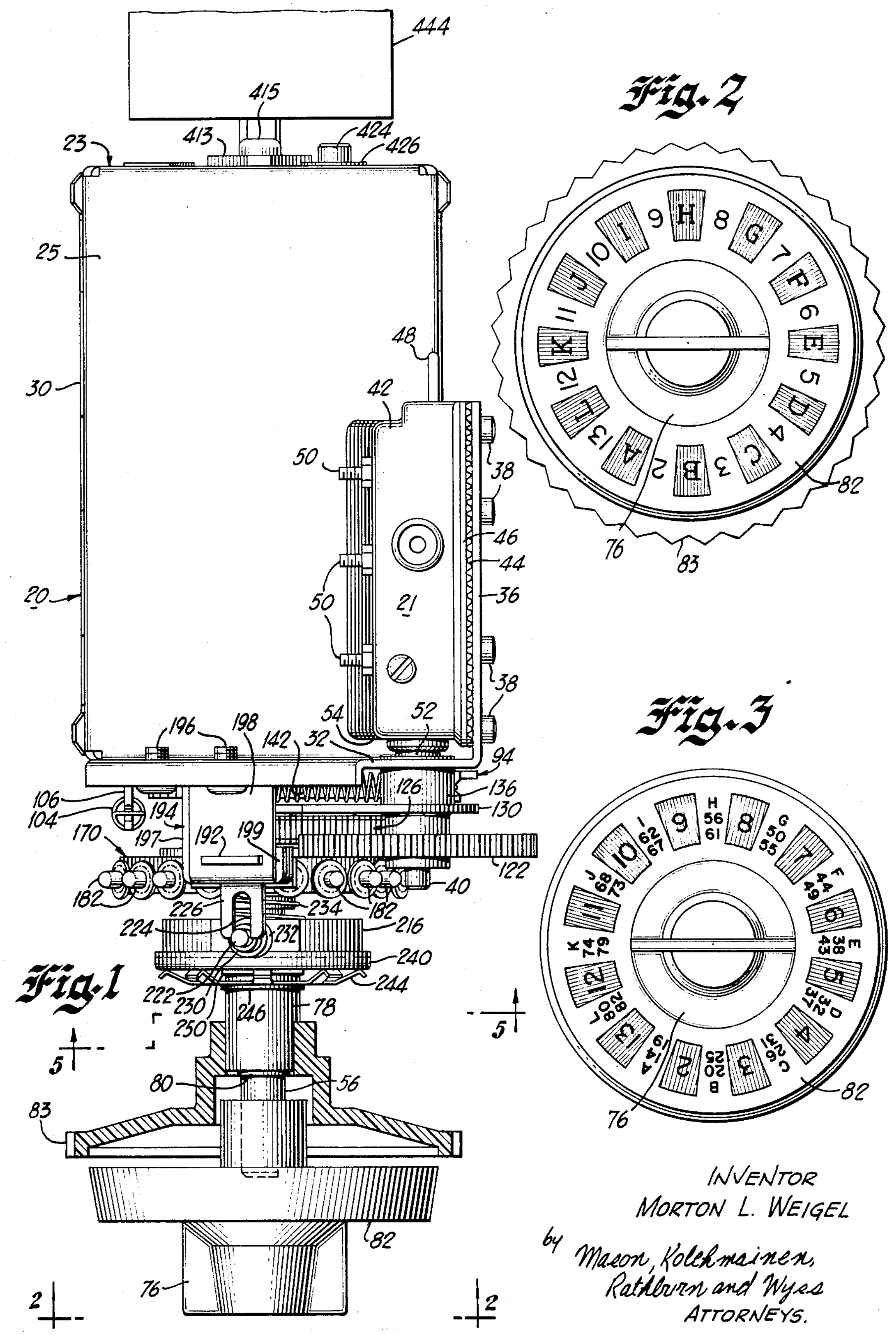
FIG. 1 is a top plan view of a combined VHF-UHF television tuner embodying the features of the present invention.
FIG. 2 is a fragmentary front view taken along the lines 2—2 of FIG. 1 and illustrating one dial arrangement for the tuner of FIG. 1.
FIG. 3 is a view similar to FIG. 2 but showing a different dial arrangement.
Figure 9:
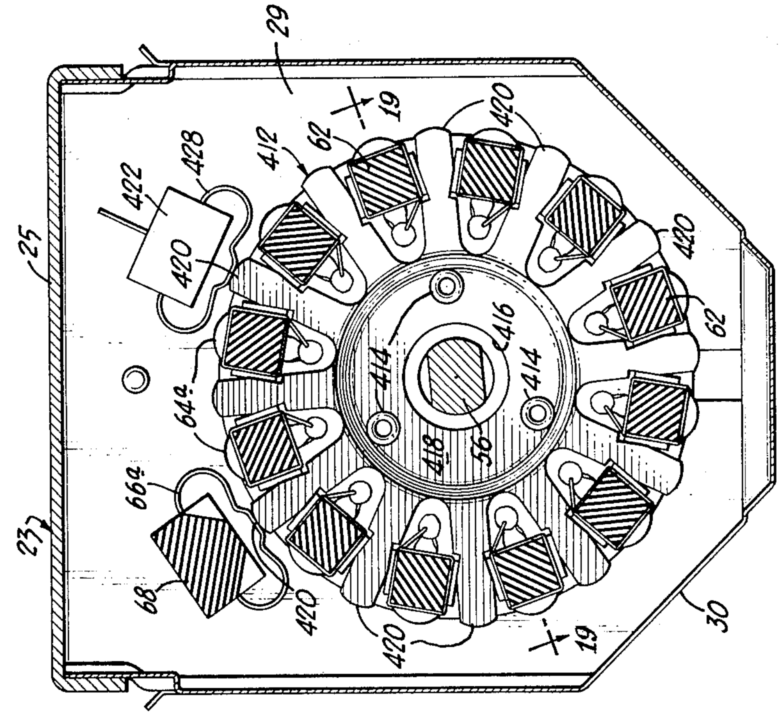
FIG. 9 is a sectional view taken along the lines 9—9 FIG. 4.
Figure 8:
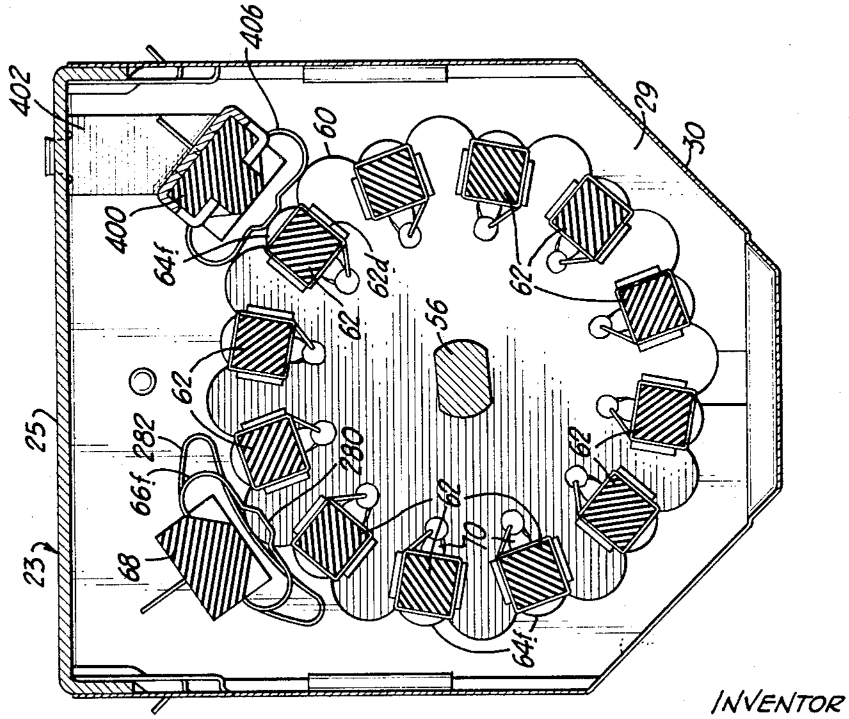
FIG. 8 is a sectional view taken along the lines 8—8 of FIG. 4.
Figure 11:
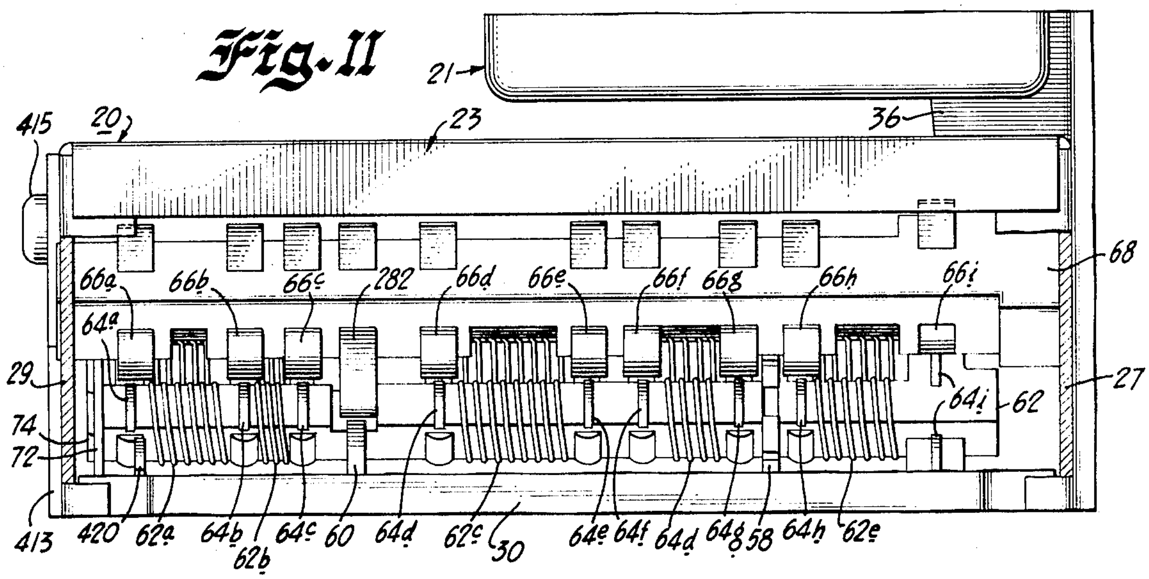
FIG. 11 is a fragmentary left-hand view of the tuner of FIG. 1 with a portion of the shield broken away.
Figure 20:
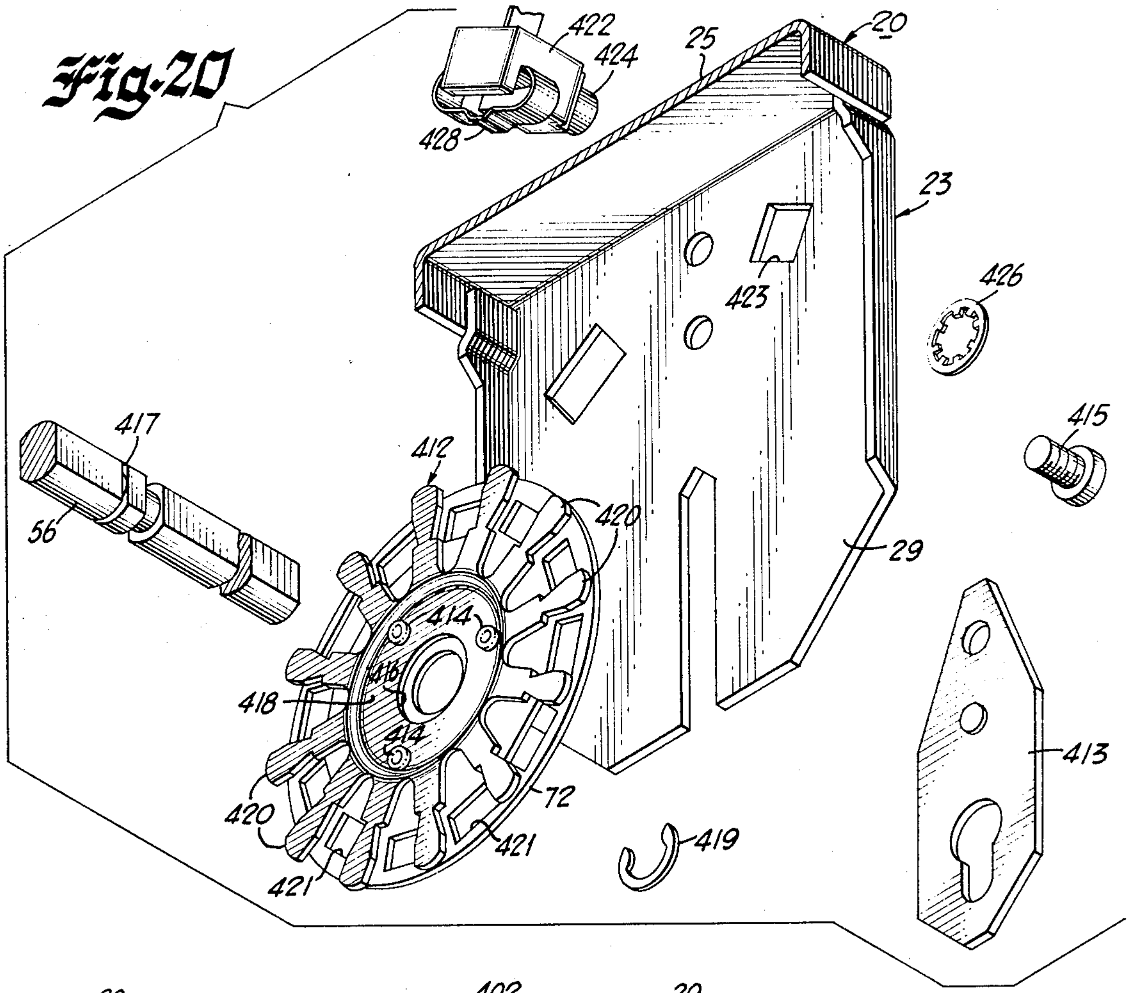
Figure 21:
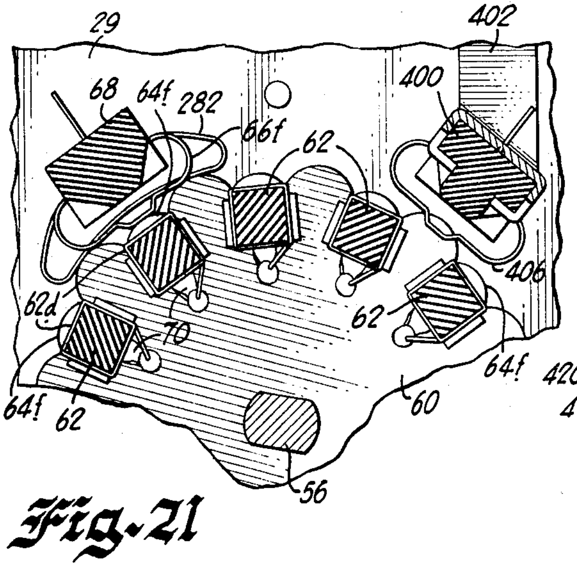
Figure 22:
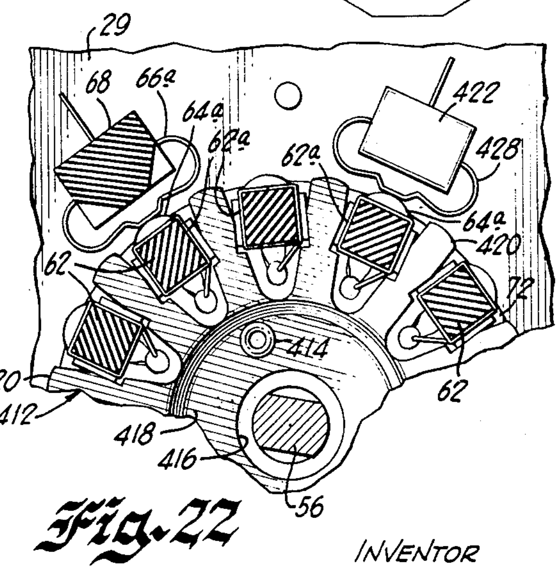
Figure 23:
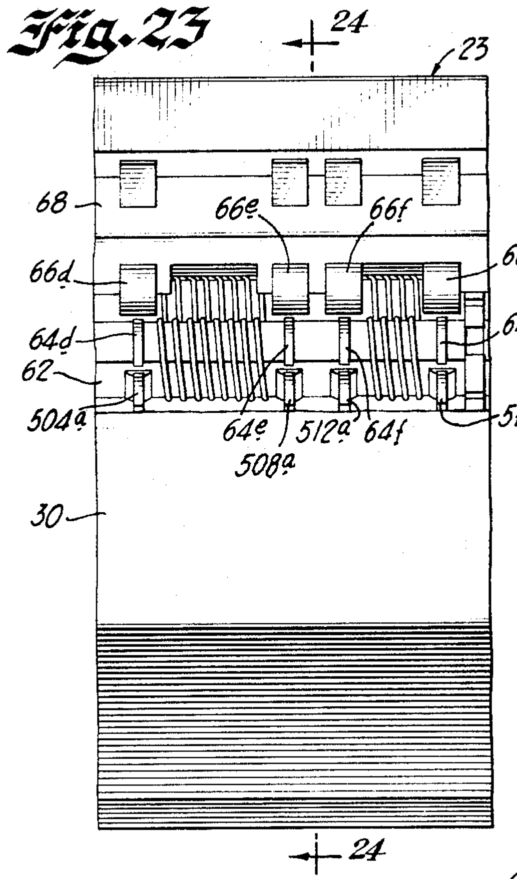
Figure 25:
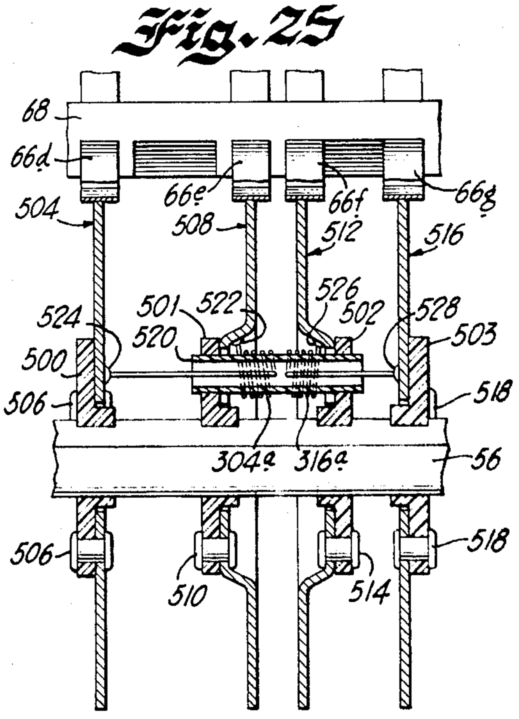
Figure 24:
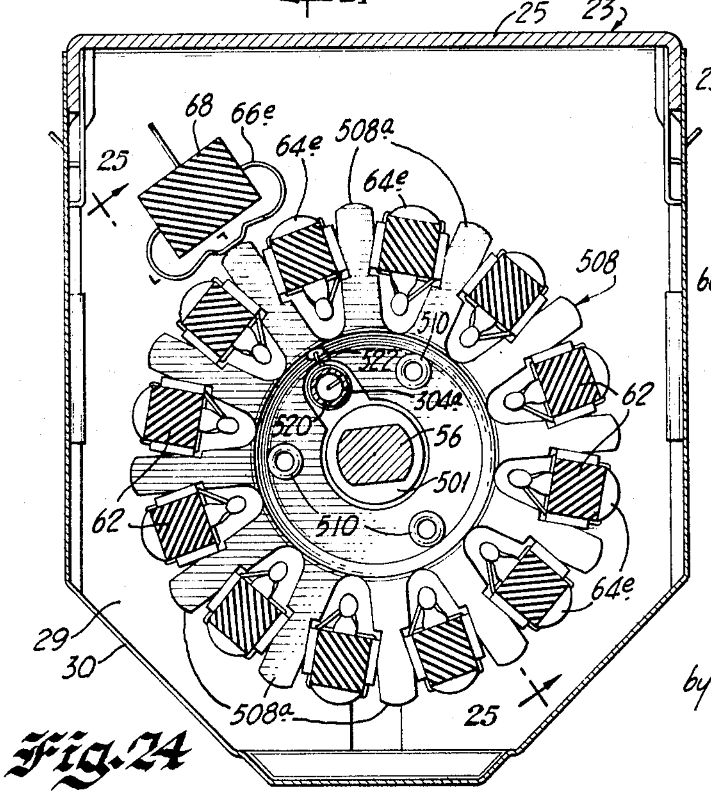

FIG. 20 view an exploded vire of the switching arrangement provided in the rear of the VHF tuner portion of the tuner of FIG. 1;

FIG. 21 is a fragmentary sectional view similar to FIG. 8 but with the channel selector shaft in a VHF position;

FIG. 22 is a fragmentary sectional view similar to FIG. 9 but with the channel selector shaft in a VHF position;

FIG. 23 is a fragmentary view similar to FIG. 11 but illustrating an alternative embodiment of the invention;

FIG. 24 is a sectional view taken along the lines 24—24 of FIG. 23;

FIG. 25 is a sectional view taken along the lines 25—25 of FIG. 24; and

Figure 26:
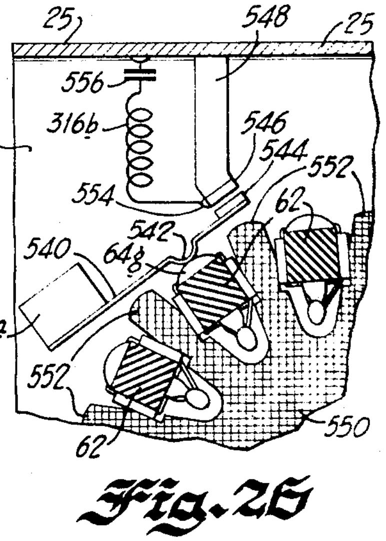

FIG. 26 is a fragmentary sectional view similar to FIG. 24 but illustrating a further alternative embodiment of the present invention.

Referring now to FIG. 1 of the drawings, the present invention is therein illustrated as comprising a VHF tuner portion indicated generally at 20 and a UHF portion indicated generally at 21. The VHF tuner portion includes a generally U-shaped chassis 23, having a top wall 25, a front end wall 27 and a rear end wall 29. A generally U-shaped shield member 30 cooperates with the chassis 23 to provide a substantially totally enclosed VHF tuner portion.

Figures 5, 17:
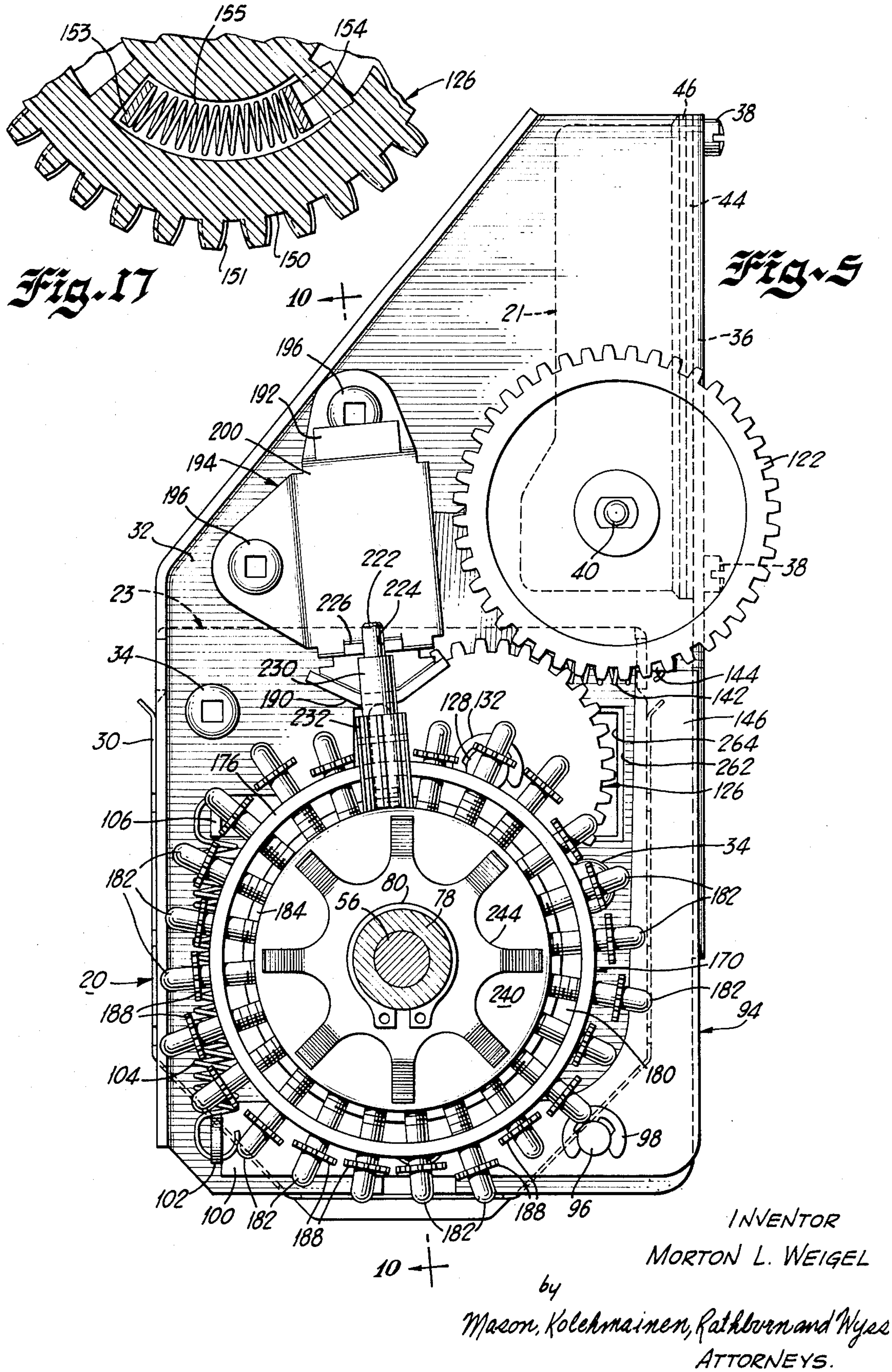
FIG. 5 is a sectional view taken along the lines 5—5 of FIG. 1.
FIG. 17 is a sectional view taken along the lines 17—17 of FIG. 12.
Figures 12, 16:
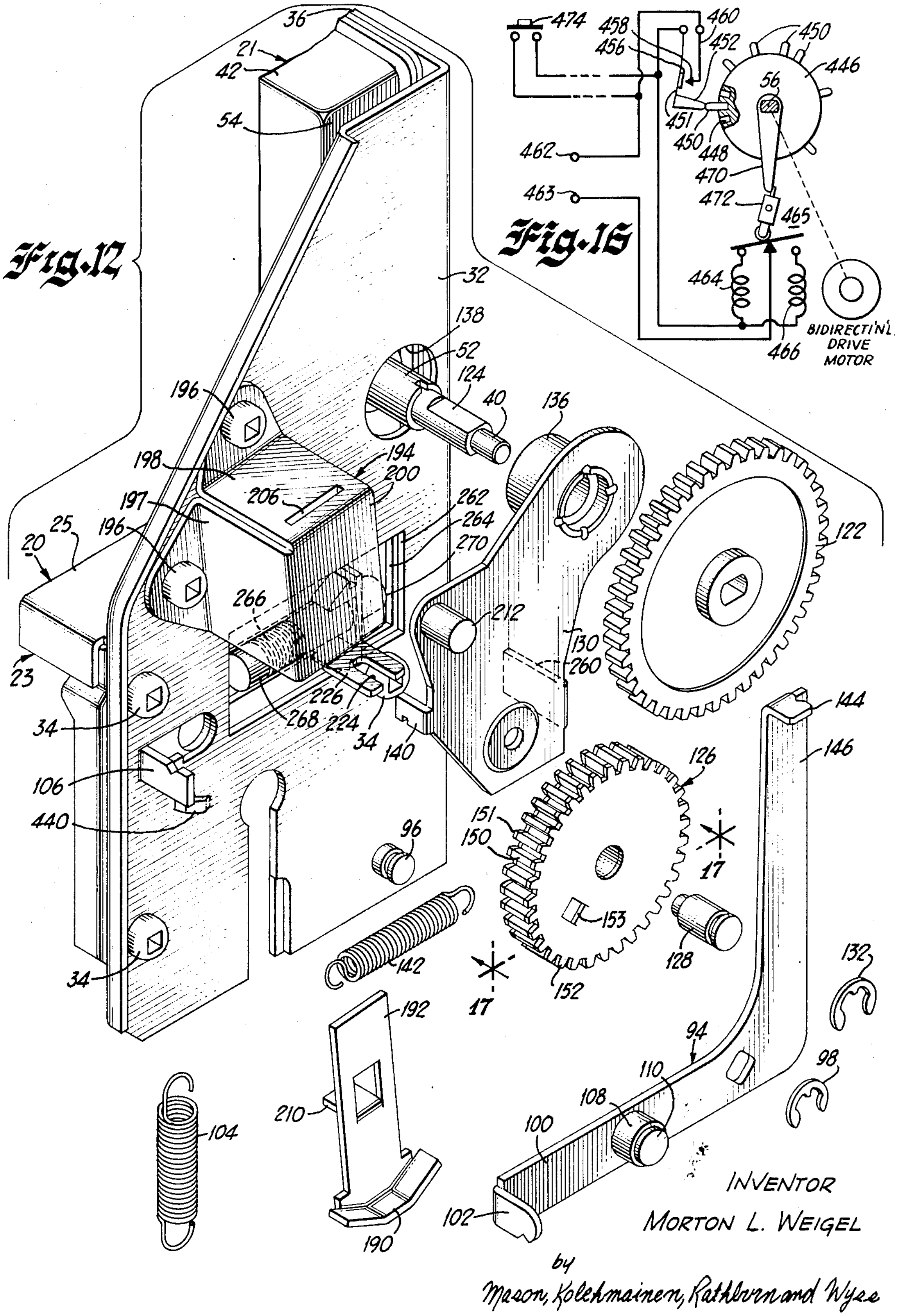
FIG. 12 is an exploded view of a partion of the drive mechanism employed in the tuner of FIG. 1.
FIG. 16 is a schematic diagram, partly diagrammatic, of the remote control drive arrangement employed in the tuner of FIG. 1.

A supporting bracket 32 (FIG. 5) is mounted on the front end wall 27 of the VHF tuner portion 20 by means of mounting screws 34 (FIG. 12). The UHF tuner portion 21 is mounted on a rearwardly extending flange portion 36 of the bracket 32 by means of the mounting screws 38.

The UHF tuner section 21 is of the so-called continuous tuning type and includes a main tuning shaft 40 which carries the variable tuning elements, preferably in the form of small variable capacitors, for the RF, mixer and oscillator sections of the UHF tuner portion. While a specific arrangement for the UHF tuner portion 21 will be described hereinafter, it will be understood that the portion 21 may comprise any suitable electrical arrangement for receiving all of the 70 UHF television stations in response to continuous rotation of the main tuning shaft 40 and includes facilities for converting the received UHF television signal into a suitable intermediate frequency signal, preferably in the frequency range of 40 megacycles.

In the illustrated embodiment, the electrical elements of the UHF tuner portion 21 are contained within a die cast housing 42 (FIG. 1) and the plate portion 36 of the bracket 32 forms the right-hand side wall of the tuner section 21, a corrugated shielding plate 44 being preferably provided between the lip portion 46 of the housing 42 and the plate 36 to insure that a completely shielded enclosure is provided for the UHF electrical tuning elements. The tuner portion 21 is provided with a pair of input terminals 48 to which a suitable UHF antenna arrangement may be connected and each of the tuning sections of the UHF portion 21 is provided with a suitable adjustment device having screw threaded portions 50 extending through the side walls of the housing 42 for alignment purposes, as will be described in more detail hereinafter. The main tuning shaft 40 is rotatably mounted in a bushing 52 (FIG. 12), the bushing 52 being mounted in the front wall 54 of the housing 42.

Figure 4:
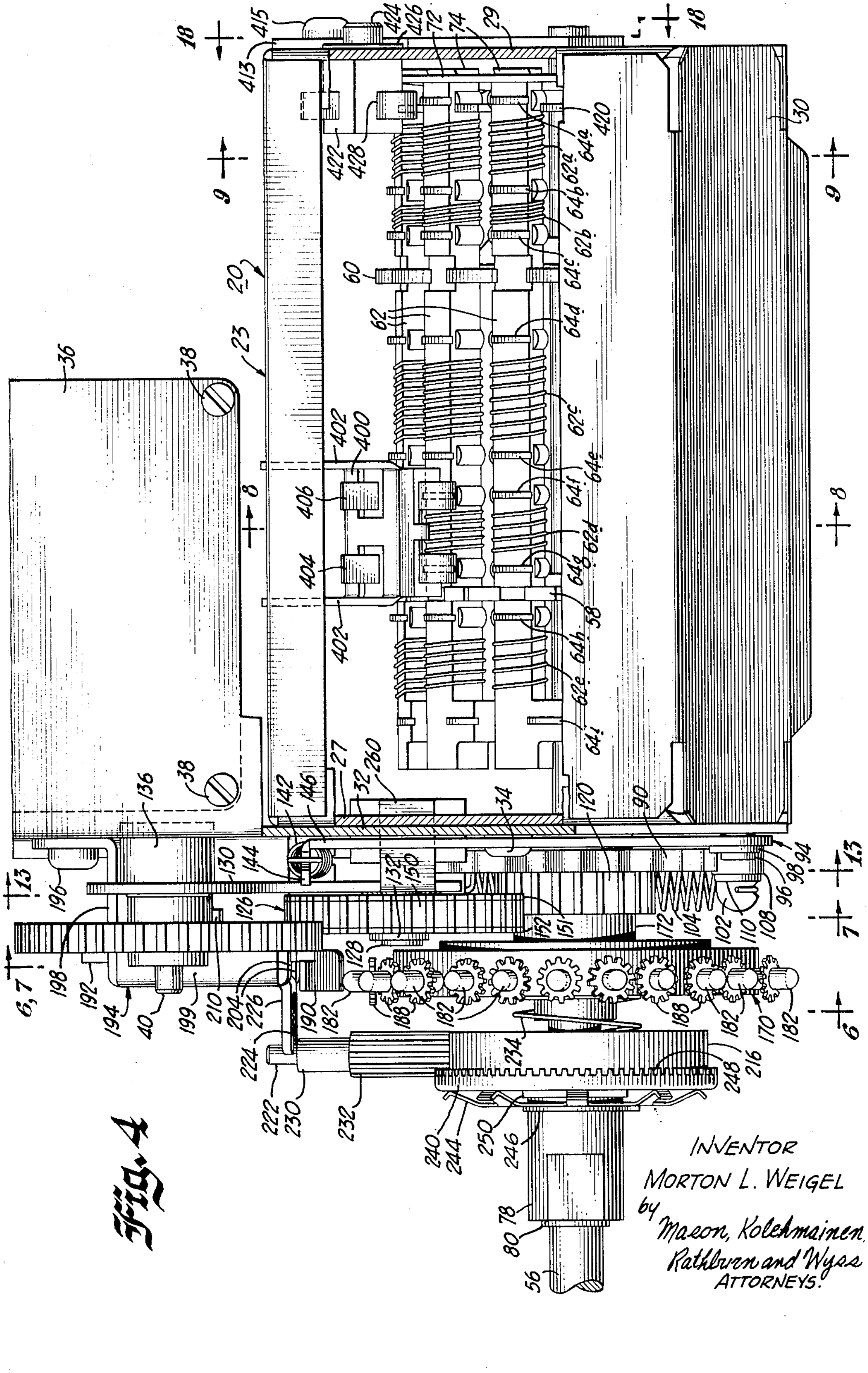
FIG. 4 is a right side view of the tuner of FIG. 1 with a portion of the tuner shield broken away.

The VHF tuner portion 20 is, in the illustrated embodiment, of the so-called turret type and includes a station selector shaft 56 which is rotatably mounted in the end walls 27, 29 of the VHF tuner portion 20. Within the chassis 23, a pair of transverse discs 58 and 60 (FIG. 4) are mounted on the shaft 56 and are provided with suitable notches in the periphery thereof to receive and removably retain a plurality of tuning sticks 62 along the length of which are wound the tuning coils for the RF amplifier, mixer and oscillator sectins of the VHF tuner portion 20. Thus, each of the tuning sticks 62 is provided with the tuning coils **62*a* and 62*b* which function to tune the input of the RF amplifier section of the VHF tuner portion 20, a tuning coil 62*c* which functions to tune the output of the RF amplifier stage, the tuning coil 62*d* which functions as the input coil for the mixer stage and the tuning coil 62*e* which functions as the local oscillator tuning coil for the oscillator stage of the VHF tuner portion 20**.

Each of the tuning sticks 62 is also provided with a series of conductive terminal members 64 having beveled contact engaging surfaces which project from one side of the tuning stick 62 and are arranged to be connected to a plurality of stator contacts 66 which are mounted on and spaced along the length of a stator bar 68 of insulating material. The stator bar 68 is mounted between the end walls 27 and 29 of the chassis 23. The tuning coils **62*a* to 62*e*, inclusive, are wound around the periphery of the tuning sticks 62, and the ends of these coils are electrically connected to portions 70 of the conductive terminal members 64 which project from the other side of the tuning sticks 62. More particularly, the ends of the tuning coils 62*a* are connected to the projecting portions 70 of the conductive terminal members 64*a* and 64*b*, the ends of the coil 62*b* are connected to the terminals 64*b* and 64*c*, the ends of the coil 62*c* are connected to the conductive terminals 64*d* and 64*e*, the ends of the tuning coils 62*d* are connected to the conductive terminals 64*f* and 64*g*, and the ends of the tuning coil 62e are connected to the conductive terminals 62*h* and 64*i***.

In the illustrated embodiment, an end retaining disc 72 is provided at the rear of the VHF tuner portion 20 which has a plurality of apertures 421 adapted to receive the end portions 74 of the tuning sticks 62. Also, the transverse disc 58 is provided with suitable means such as resilient jaws adjacent the stick receiving notches therein for retaining the forward end of this tuning stick 62 in the turret structure. Accordingly, the individual sticks 62 may be readily removed and replaced by simply lifting the forward end of the stick out of the notch in the disc 58, and, when the stick is clear of the disc 60, the rear end 74 thereof may be removed from the retaining disc 72.

The VHF turret tuner portion described thus far, including the tuning sticks 62, may be constructed in the manner shown and described in detail in the copending application of James E. Krepps and Morton L Weigel, Ser. No. 120,440, filed June 28, 1961, now issued as U.S. Pat. No. 3,210,700. However, it is pointed out that insofar as the present invention is concerned, the VHF turret structure may comprise any other suitable coil supporting arrangement wherein individual tuning panels or sticks are successively moved into engagement with a series of stator contacts upon rotation of the channel selector shaft. Also, the VHF tuner portion 20 may comprise a series of switch wafers mounted on a common channel selector shaft, the stationary stator portions of these switch wafers carrying incremental tuning coils for the different portions of the tuner, provided the switch contacts are of the non-short-circuiting type, as will be readily understood by those skilled in the art.

A channel selector knob 76 is secured to the front end of the channel selector shaft 56 and a concentric shaft 78 is rotatably mounted on the selector shaft 56 and is normally positioned against a retaining washer 80 which is positioned in a groove in the shaft 56.

In accordance with an important aspect of the present invention, the selector shaft 56 is provided with a suitable detent arrangement for establishing 24 separate and distinct positions for the shaft 56 as this shaft is rotated through 360°. However, the VHF tuner portion 20 is provided with only 12 of the tuning sticks 62 for reception of the 12 VHF television channels and these tuning sticks are arranged at 30° angular intervals around the periphery of the positioning discs 58 and 60. In the detent positions intermediate the twelve VHF channel positions, the VHF tuner portion 20 is arranged to operate as a 40 megacycle I.F. amplifier and the I.F. signal produced by the UHF tuner portion 21 is connected to the input of the VHF tuner portion 20 in place of the VHF antenna circuit.

The main tuning shaft 40 of the UHF tuner portion 21 is mechanically interconnected with the channel selector shaft 56 so that in the alternate UHF positions of the shaft 56 a different band of six UHF television stations will be selected. Within a particular transmission area, UHF television stations are allocated by the FCC on the basis that each UHF station is six channels away from the next UHF station. Accordingly, when the channel selector shaft 56 is moved to one of the 12 UHF positions, only one UHF station will be received by the UHF tuner portion 21. This particular UHF station is then tuned in by rotating the concentric shaft 78 which is mechanically interconnected with the UHF main tuning shaft 40, by means described in more detail hereinafter, to provide a relatively slow speed or fine tuning adjustment of the main tuning shaft 40. In addition, the concentric shaft 78 is arranged to provide the customary fine tuning for VHF channels when the channel selector shaft 56 is in one of the VHF channel positions.

With the arrangement of the present invention, only the two tuning knobs 76 and 83 are required to select any one of the 82 VHF and UHF television channels and to precisely tune in the selected channel. Furthermore, selection of UHF stations is done in a manner very similar to the procedure now followed in VHF only tuners wherein one of the twelve VHF channels is first selected by rotating a mechanically detented VHF tuning knob to the desired station, and then the station is precisely tuned in by rotation of a concentric fine tuning knob. In the arrangement of the present invention the detented tuning knob 75 has 24 positions, 12 of which correspond to VHF channels and 12 of which correspond to UHF channels, or bands of UHF channels, within which there will be only one UHF channel due to FCC allocations. Either a VHF channel or a UHF channel is selected by rotating the shaft 56 to the proper one of the 24 positions, and the desired VHF or UHF station is then precisely tuned in by rotation of the concentric shaft 78.

While any suitable station indicating arrangement may be employed, in FIGS. 2 and 3 of the drawings there is shown two possible arrangements of channel indications with the tuner of the present invention. Thus, referring to FIG. 2, the channel selector knob 76 is provided with an outwardly extending flange portion 82 and suitable indicia are imprinted or otherwise affixed to the portion 82 which cooperate with a stationary marker on the television cabinet (not shown) to indicate the particular one of the twenty-four positions of the shaft 56. For example, the indicia on the portion 82 may comprise the numbers 2 to 13, inclusive, corresponding to the twelve VHF channels, and, interleaved with these indicia, a series of 12 areas are suitably marked to indicate a corresponding band of UHF television channels, these areas being arbitrarily marked by the letters A to L, inclusive. Preferably, the areas containing the letters A to L, inclusive, are so constructed and arranged that they may be readily distinguished from the VHF channel positions 2 to 13, inclusive. For example, the letters A-L, may be placed on a raised background imprinted with a different color. or any other suitable arrangement may be employed to distinguish the UHF channel positions of the shaft 56 from the VHF channel positions of this shaft In the arrangement of FIG. 3 the portion 82 of the knob 76 has the UHF channel indicia 2 to 13, inclusive, on a distinctive background, and between these indicia suitable markings are given to indicate the UHF channels of the particular UHF band which is selected in that position of the shaft 56. For example, beneath the letter H the numbers 56 and 61 appear, indicating that UHF channel Nos. 56 to 61, inclusive, are selectable in that position of the channel selector shaft 56.

Figure 10:
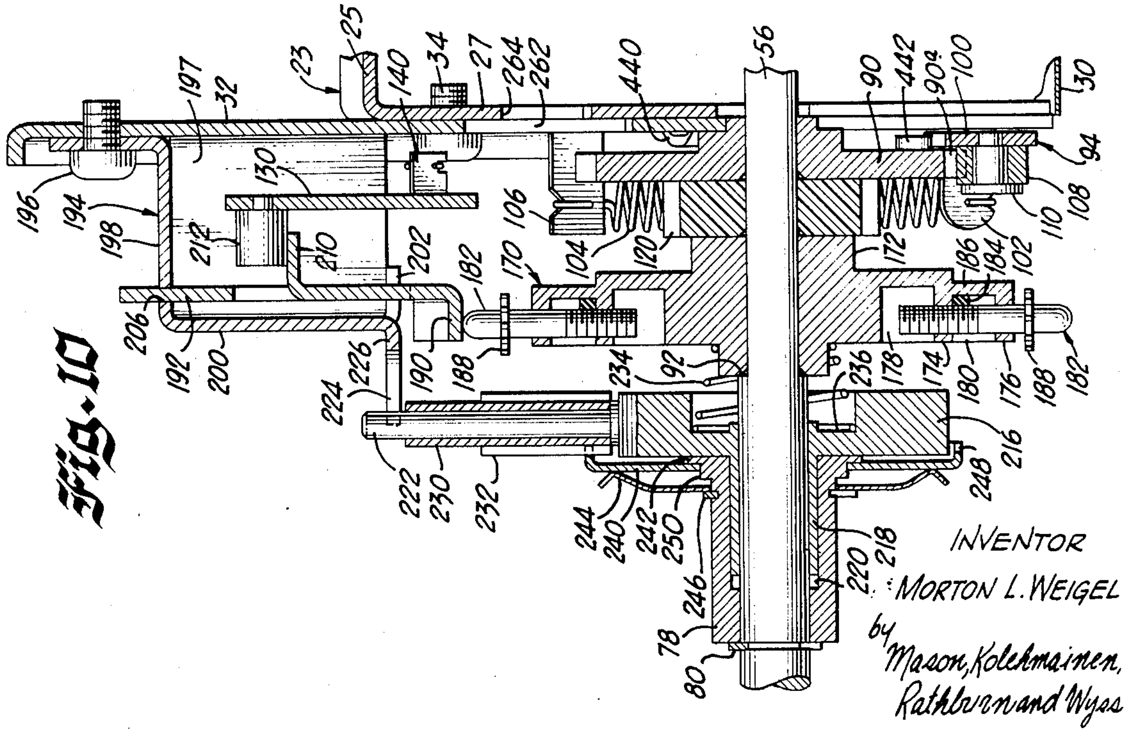
FIG. 10 is a sectional view taken along the lines 10—10 of FIG. 5.

Considering now the 24-position detent arrangement which is provided for the channel selector shaft 56 to accomplish the objectives generally described above, a detent wheel 90 (FIG. 7), which has 24 notches in the periphery thereof, is secured to the channel selector shaft 56. Preferably, the forward end portion of the channel selector shaft 56 on which the concentric shaft 78 is mounted, is of circular cross section, and the shaft 56 is provided with a shoulder 92 (FIG. 10) to the rear of which the shaft 56 has a double D cross section. The detent wheel 90 has a similarly shaped opening therein and is press fitted onto the shaft 56 so that the index wheel 90 is securely connected to the shaft 56 and rotates therewith.

Figures 6, 7:
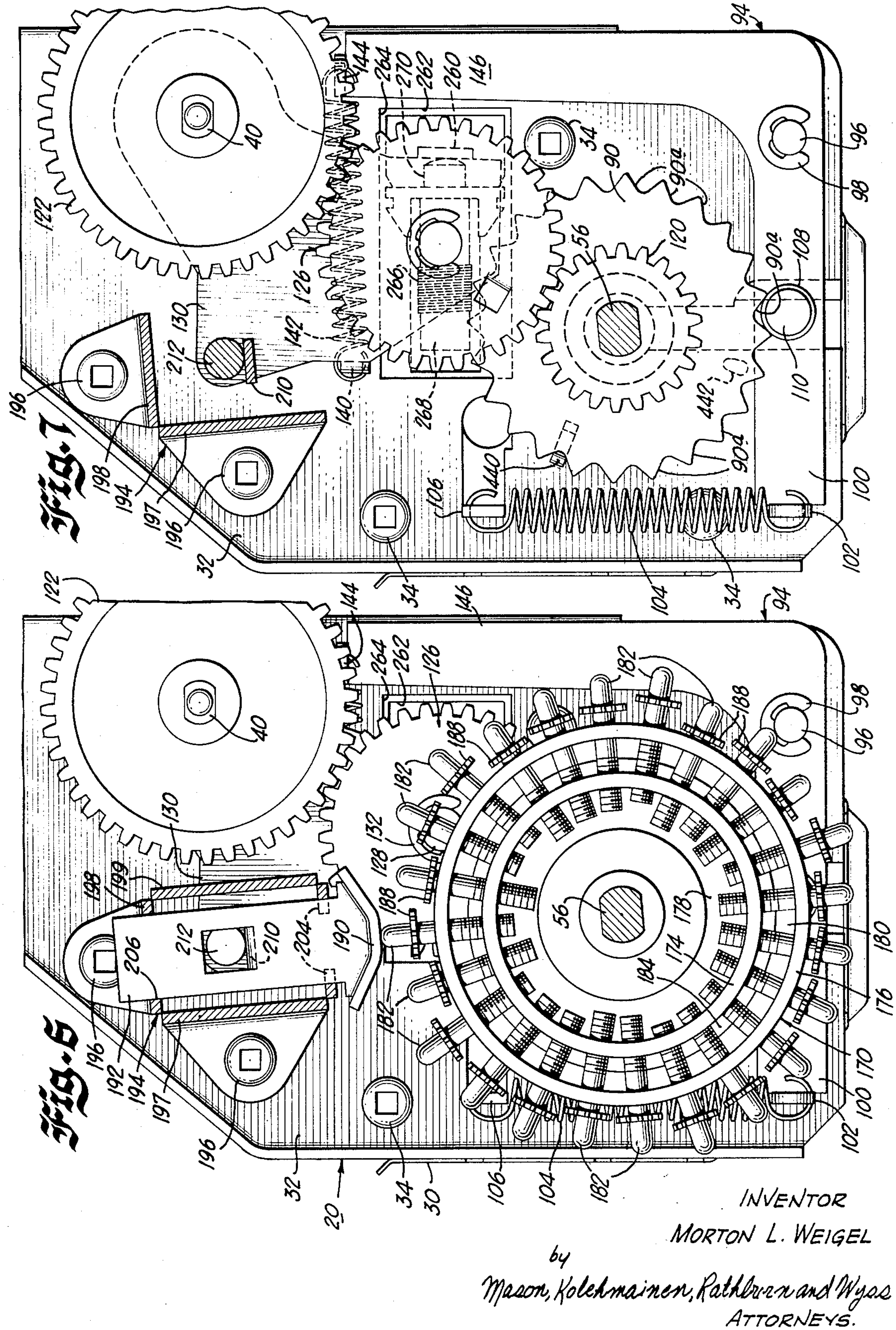
FIG. 6 is a sectional view taken along the lines 6—6 of FIG. 4.
FIG. 7 is a sectional view taken along the lines 7—7 of FIG. 4.

In order to provide a detent member which may be biased into engagement with one of the notches of the index wheel 90, there is provided an L shaped lever 94 which is pivotally mounted on a post 96 which is mounted in the front mounting bracket 32, a C washer 98 being provided to retain the lever 94 on the post 96. The horizontal arm 100 of the lever 94 is provided with an end flange 102 to which is connected one end of a coil spring 104, the other end of the spring 104 being connected to a lug 106 which is struck up out of the mounting bracket 32. A roller member 108 is rotatably journaled on a post 110 which is mounted on the horizontal arm 100 and is positioned along the arm 100 so that the roller 108 seats within one of the notches **90*a* under the bias of the spring 104, as shown in FIG. 7, so that the shaft 56** is detented or restrained in each of 24 separate and distinct positions as this shaft is rotated through 360°.

Since twelve of the 24 positions of the shaft 56 are employed for the reception of different bands of UHF television stations, it is necessary to mechanically interconnect the shaft 56 with the main tuning shaft 40 of the UHF tuner portion 21. Also, in the illustrated embodiment, the main UHF tuner shaft requires only 180 degrees of rotation to cover the entire UHF band of television stations since variable capacitor elements are employed as the tuning selectors for UHF, and, as is well known, these capacitors move from minimum to maximum capacity within 180° of rotation to the shaft 40. Accordingly, it is necessary to provide a 2 to 1 gear reduction between the shaft 56 and the shaft 40. More particularly, a driving gear 120 is mounted on the channel selector 56 immediately forward of the index wheel 90, a driven gear 122 is mounted on the double D end portion 124 (FIG. 12) of the main UHF tuning shaft 40 and an idler gear 125 is employed to interconnect the driving gear 120 and driven gear 122.

The idler gear 126 is rotatably mounted on a post 128 which is secured to an idler plate 130, the gear 126 being retained on the post 128 by means of the retaining washer 132. The idler plate 130 is pivotally mounted on the same center as the main UHF tuning shaft 40. More particularly, a bearing sleeve 136 is secured to the idler plate 130, the bearing sleeve 136 being pivotally mounted on the bearing hub 52 secured to the UHF housing 42. A clearance hole 138 for the bearing sleeve 136 is provided in the main mounting bracket 32.

In order to bias the idler plate 130 into engagement with the associated tuning mechanism described hereinafter, the idler plate 130 is provided with a rearwardly extending flange 140 and a coil spring 142 is connected between the flange 140 and an end flange 144 on the upper end of the vertical arm 146 of the detent lever 94.

In accordance with a further aspect of the invention, the gear 126 is of the anti-backlash type so that an extremely precise 2 to 1 drive ratio is provided between the selector shaft 56 and the UHF main tuning shaft 40. More particularly, the gear 126 includes a center gear element 150, preferably of a suitable plastic material, and a pair of outer gear elements 151 and 152 which are preferably of metal. The outer elements 151 and 152 are provided with inwardly extending opposed tongue portions 153 and 154 and a spring 155 (FIG. 17) is positioned between these tongue portions so as to urge the outer gear elements 151 and 152 apart. Accordingly, anti-backlash drive is provided between the driving gear 120 and the gear elements 150 and 152 and a similar anti-backlash connection is provided between the gear 122 and the gear elements 151 and 150.

The above-described drive connection to the main UHF tuning shaft 40 is effective to position this shaft in equal fifteen degree increments corresponding to each one of the UHF positions of the selector shaft 56 which UHF positions are spaced 30 degrees apart. Accordingly, a particular band of six UHF channels may be rapidly selected by merely rotating the channel selector knob 76 to the desired UHF position. While only one UHF station will be received in any given reception area within the selected band of six UHF channels, it is still necessary to provide an arrangement for precisely tuning the main tuning shaft 40 to the exact frequency of this particular UHF channel within the selected band of UHF channels. In order to accomplish this, and in accordance with a further important feature of the invention, there is provided an arrangement for pivoting the idler plate 130 about its pivotal axis which coincides with the axis of the UHF tuning shaft 40 while the driving gear 120 is held in a fixed position by means of the detent wheel 90 and the roller 108. When the idler plate 130 is pivoted about the axis of the UHF tuning shaft 40 while the driving gear 120 is held stationary, the idler gear 126 works against the stationary teeth of the gear 120 and rotates the driven gear 122 at an increased rate as compared to the rate of movement of the idler plate 130 itself. Thus, when the idler plate 130 is moved by an amount sufficient to move the idler gear 126 from the position shown in full lines in FIG. 14 to the position shown at 160 in dotted lines in this figure, the driven gear 122 has been rotated by a somewhat greater amount as indicated in dotted lines at 162 in FIG. 14. The gears 126 and 122 remain in mesh as the idler plate 130 is pivoted, since the idler plate 130 is mounted on the same axis as the gear 122 and the gear 126 is pivotally mounted on the plate 130. However, the idler plate 130 can be pivoted only a slight amount before the teeth of the gear 126 move out of mesh with the driven gear 120 since these gears are on centers which tend to move apart as the idler plate 130 is pivoted. The pivotal movement of the plate 130 is accordingly limited so that the gears 120 and 126 remain in mesh and the plate 130 is only moved an amount which is sufficient to produce a rotation of the main tuning shaft 40 of slightly more than 15° so as to insure that the main tuning shaft 40 may be moved through the entire band of six UHF television channels initially selected by positioning of the selector shaft 56. Preferably, this precise tuning range of the UHF main tuning shaft 40 is sufficiently greater than 15° to take care of any non-linearities in the tuning characteristic of the UHF tuning shaft 40 from one end of the UHF television band to the other.

The above-described pivotal movement of the idler plate 130 to accomplish precise tuning to a particular UHF channel can be accomplished by any suitable camming interconnection between the precise tuning shaft 78 and the idler plate 130. However, in accordance with a further feature of the present invention, there is provided an arrangement for precise tuning of the individual UHF channels within the selected UHF bands of channels in a manner similar to the so-called memory fine tuning which is presently provided for VHF channels on some VHF television tuners. Furthermore, the arrangement of the present invention incorporates VHF memory fine tuning in the same structure which accomplishes the precise tuning of the UHF main tuning shaft 40. Accordingly, with the arrangement of the present invention, it is necessary only to adjust the fine tuning knob 83 initially so that the memory fine tuning mechanism is precisely adjusted for each UHF station within the particular reception area of the television receiver and to perform an initial fine tuning operation with respect to the VHF channels in this reception area. After these initial adjustments have been made, any VHF station or UHF station in the area may be selected simply by rotating the channel selector knob 76 to the desired one of the 24 positions indicated by the dial arrangement of the tuner. Of course, precise tuning adjustment to a particular UHF channel may be changed, as desired, by adjustment of the knob 83 to accommodate a change in reception conditions or in the event that a different or additional UHF station is added in a particular reception area.

Considering now the arrangement provided in accordance with the present invention for precise memory tuning for both VHF and UHF channels, a memory drum or carrier indicated generally at 170 (FIG. 5) is provided with a hub portion 172 which is positioned on the selector shaft 56 immediately ahead of the gear 120, the hub portion 172 being provided with a double D opening corresponding to the adjacent portion of the shaft 56 so that the hub 172 rotates with the shaft 56. The memory drum 170 also includes a pair of forwardly extending concentric annular flanges 174 and 176 which are spaced apart to define concentric annular recesses 178 and 180. A series of 24 radially extending tuning control elements, indicated generally at 182, are arranged about the periphery of the flange 176. The inner ends of the tuning control elements 182 are threaded into correspondingly threaded apertures in the inner flange 174 and extend through clearance openings in the outer flange 176. An annular resilient gasket 184 is positioned in the recess 180 between the tuning control elements 182 and the rear wall 186 of the drum 170, the gasket 180 exerting sufficient sidewise thrust against the sides of the tuning control elements 182 so as to maintain these elements in an adjusted position as the shaft 56 is rotated.

A small gear element 188 is formed integrally on each of the tuning control elements 182 outside of the drum 170 and the outer ends of these elements are rounded so as to permit a camming engagement with the flared bottom flange portion 190 of a tuning control slide member 192 as the shaft 56 is rotated. In order to mount the slide 192 for reciprocal movement, there is provided a slide housing indicated generally at 194 which is secured to the main mounting bracket 32 by means of the screws 196 and is provided with side walls 197, 198 and 199 and a front wall 200. The front wall 200 is provided with inturned end flanges 202 which are provided with notches 204 (FIG. 6) adapted to receive the bottom end of the control slide 192, the upper end of the slide 192 being slidably mounted in a slot 206 (FIG. 12) provided in the side wall 198 of the housing 194. The intermediate portion of the slide 192 within the housing 194 is provided with a rearwardly extending tongue portion 210 which is adapted to engage a forwardly extending post 212 which is mounted on the idler plate 130.

When the particular one of the 24 tuning control elements 182 which is in engagement with the end flange 190 of the control slide 192 is rotated by means described hereinafter, the slide 192 will be reciprocated in a generally vertical direction and the engagement of the tongue 210 with the post 212 will function to produce a pivotal movement of the idler plate 130. In this connection it is noted that the spring 142 exerts a biasing force downwardly on the post 212 so as to hold the tongue 210 in engagement therewith, as the active tuning control element 182 is rotated and the slide 192 is moved up and down.

In order to provide an arrangement whereby the active one of the tuning control elements 182 may be rotated in response to rotation of the knob 83, a push-to-engage arrangement is provided whereby the knob 83 is biased to a forward position and is pushed rearwardly to engage the active control element 182 whereupon the knob 83 is rotated to perform the desired adjustment. More particularly, a hub 216 is slidably positioned on the selector shaft 56 and is provided with a forwardly extending sleeve portion 218 which extends into a corresponding bore 220 in the concentric tuning shaft 78. A vertically extending post 222 is mounted in the upper edge of the hub 216, the upper end of the post being positioned within a notch 224 formed in a forwardly extending tongue portion 226 of the top wall 200 of the housing 194. With this arrangement, the shaft 78 and the hub 216 may be slid rearwardly along the shaft 56 while engagement of the post 222 within the notch 224 prevents rotation of the hub 216 when the shaft 78 is rotated. A sleeve 230 is rotatably mounted on the post 222 and has a series of small gear teeth 232 extending along a portion of the length thereof, the gear teeth 232 being adapted to engage with the teeth of the gear element 188 on the active tuning control element 182 when the hub 216 is moved rearwardly. The concentric tuning shaft 78 is biased to a forward position by means of a coil spring 234 which is positioned between the hub 172 of the memory drum 170 and a recess 236 formed in the rear side of the hub 216.

In order to rotate the sleeve 230 in response to rotation of the shaft 78, a crown gear plate 240 (FIG. 4) is provided which is held against an outwardly extending flange portion 242 of the shaft 78 by means of a multi-fingered spring disc 244 the center portion of which is positioned beneath a retaining washer 246 and the outer finger portions of which engage the crown gear plate 240 near the outer edge thereof. The rearwardly turned edge of the crown plate 240 is provided with a series of fine gear teeth 248 which are in engagement with the gear teeth 232 on the sleeve 230. Furthermore, the crown plate 240 is seated on a square shouldered boss 250 formed in the shaft 78 adjacent the flange 242 so that as the shaft 78 is rotated, the crown gear plate 240 also rotates and functions to rotate the gear sleeve 230 on the post 222.

With this arrangement, when the knob 83 is pushed rearwardly, the hub 216 is moved rearwardly until the gear teeth 232 engage the gear teeth 188 on the active control element 182, and, when the knob 83 is rotated while in this rearward position, the crown gear plate 240 rotates the sleeve 230 which in turn rotates the tuning control element 182 so that this element is moved radially with respect to the shaft 56. When rearward pressure on the knob 83 is removed, the spring 234 moves the knob to its normal forward position shown in FIG. 1 in which position the gear teeth 232 are out of the path of the gear teeth of the tuning control elements 182 so that the shaft 56 may be rotated without interference.

It will be noted that the tuning control elements 182 may be adjusted toward the shaft 56 to a point where the gear teeth 188 ride on the outer surface of the hub 172, at which point the tuning control element 182 cannot be moved further inwardly. In order to prevent damage to the push-to-engage tuning mechanism in the event that further pressure is exerted on the tuning knob 83 in the same direction, the teeth 248 of the crown gear plate 240 are arranged to slide over the teeth 232 against the force of the spring fingers of the disc 244. Such action is permitted since the plate 240 is connected to the shaft 78 only through the square shouldered boss portion 250.

Considering now the operation of the above-described memory tuning arrangement for precise tuning to a particular UHF station, and assuming that the shaft 56 has been moved to a particular UHF position within which a UHF television signal is being received, the knob 83 is first moved rearwardly so that the gear teeth 232 are moved into engagement with the gear teeth 188 on that particular one of the tuning control elements 182 which is in engagement with the control slide 192. After the gear teeth 232 and 188 are engaged, the knob 83 is rotated so as to move the tuning control element 182 radially. This causes corresponding movement of the control slide 192 and due to the engagement of the tongue 210 with the post 212, a corresponding pivotal movement of the idler plate 130 is produced. When the idler plate 130 is thus moved, it is pivoted about the axis of the UHF main tuning shaft 40, and since the gear 120 is held stationary by the 24 position detent mechanism, the idler gear 126 is rotated through a small angle and the driven gear 122 and hence the main UHF tuning shaft 40 is rotated through a somewhat greater angle. Due to the speed reduction accomplished through the crown gear plate 240 and the interconnecting mechanism to the idler plate 130, a precise tuning of the shaft 40 to the desired UHF station can thus be accomplished. Preferably, the gear ratio between the crown gear plate 240 and the gear teeth 232, and the other factors involved, are adjusted so that approximately 300° of rotation of the knob 83 are effective to tune the main tuning shaft 40 over an angle sufficient to cover slightly more than six UHF television stations.

After the UHF station has been precisely tuned in by rotation of the knob 83, this knob is released and the gear teeth 232 are moved out of the path of the tuning control elements 182. Each of the tuning control elements 182 corresponding to a particular UHF station which is received in a given area may be similarly adjusted by rotating the channel selector shaft 56 to the corresponding UHF position and performing the above-described precise UHF tuning operation. After this precise initial tuning operation has been completed, it is merely necessary to rotate the shaft 56 to a particular UHF position in which a UHF signal is present and the corresponding previously adjusted control element 182 will function to move the control slide 192 and pivot the idler plate 130 by an amount sufficient to provide precise tuning to this desired UHF signal.

Figure 13:
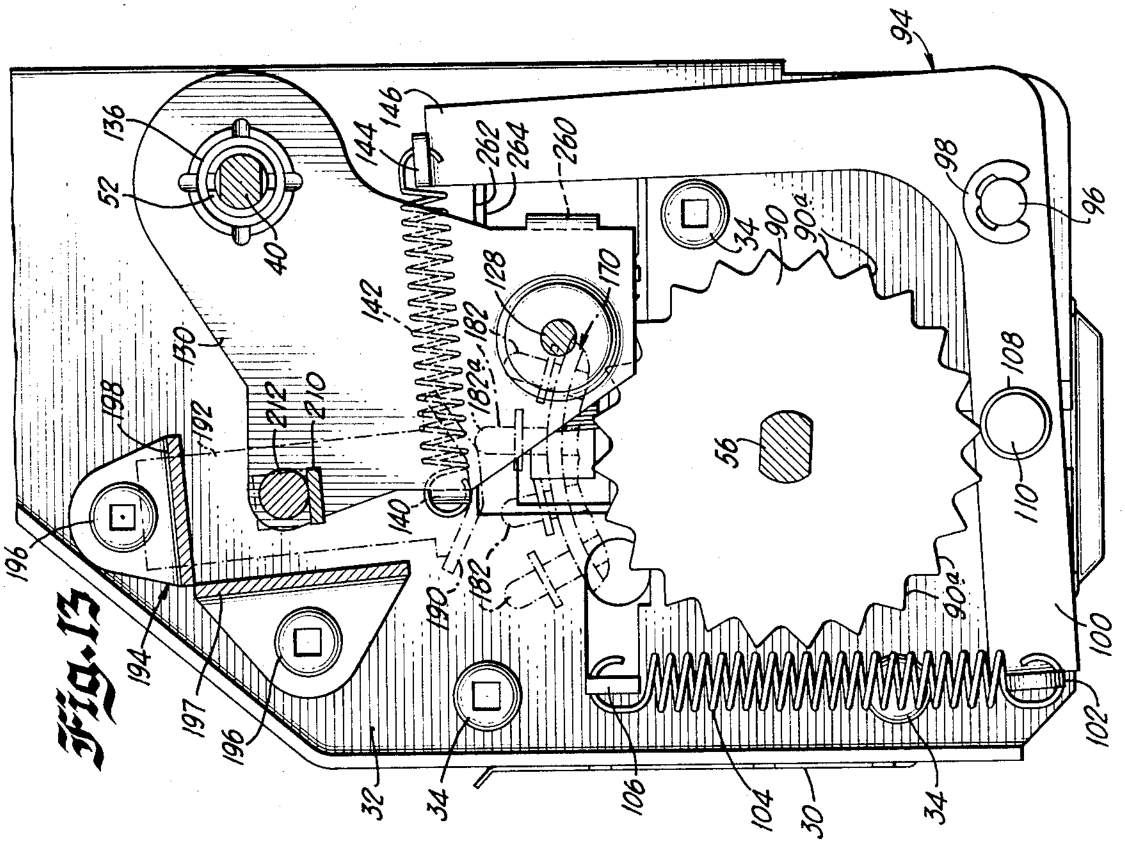
FIG. 13 is a sectional view taken along the lines 13—13 of FIG. 4 but showing the index mechanism in a different position.

As described heretofore, the memory drum 170 is provided with 24 tuning control elements 182 and only 12 of these elements are employed for precise UHF tuning. The other twelve tuning control elements 182, which are interspersed with the UHF ones, are employed to provide A MEMORY fine tuning adjustment for the VHF channels. More particularly, the idler plate 130 is provided with a rearwardly extending flange portion 260 (FIG. 13) which extends through a clearance opening 262 in the main mounting bracket 32 and through a corresponding clearance opening 264 in the front wall 27 of the VHF tuner chassis 23. A fine tuning coil 266 is wound on a coil form 268 which is mounted on the front wall 27 of the VHF tuner chassis 23 within the opening 262 and 264. A tuning core element 270 is positioned within the coil form 268 and is spring biased so that it is urged against the flange portion 260 of the idler plate 130. Accordingly, pivotal movement of the idler plate 130 in the manner described heretofore is also effective to adjust the position of the core element 270 with respect to the coil 266 and hence will provide a fine tuning adjustment for the VHF local oscillator of the VHF tuner portion 20. When the index wheel 90 is moved to one of the VHF television channel positions, the knob 83 may be moved inwardly and rotated so as to cause rotation of the corresponding tuning control element 182 and the attendant pivotal movement of the plate 130 will be effective to adjust the fine tuning of the VHF local oscillator, as will be readily understood by those skilled in the art. There is thus provided a momory tuning arrangement for both VHF and UHF televsion channels so that it is only necessary to rotate the channel selector shaft 56 to the desired VHF or UHF channel position and the desired station is automatically tuned in. After any one of the control elements 182 has been adjusted to the desired fine tuning or precise tuning position, the resilient gasket 184 functions to hold the tuning control element in its precisely adjusted position.

When the station selector shaft 56 is rotated it will be evident that a substantial force is exerted on the outer ends of the tuning control elements 182 as they are moved into engagement with the beveled end flange 190 of the control slide 192. In order to minimize the attendant shock on these elements, and in accordance with a further feature of the invention, the 24 position detent mechanism is arranged to reduce the biasing force of the spring 142 as the shaft 56 is rotated to the next position. More particularly, when the channel selector shaft 56 is rotated half-way to the next one of the 24 positions, the roller 108 is moved into engagement with the tip of one of the teeth on the index wheel 90 so that the lever 94 is moved from the position shown in FIG. 7 to the position shown in FIG. 13. When this occurs, the upper end of the arm 146 is moved to the left so as to reduce the tension exerted by the spring 142 on the idler plate 130. Accordingly, as the next tuning control element shown in dotted lines at **182*a* in FIG. 13 (assuming counterclockwise rotation of the shaft 56) engages the end flange 190 and moves the control slide 192 upwardly, the force of the spring 142 is reduced so as to minimize the shock on the end of the control element 182*a*. However, when the index wheel 90 is rotated a slight additional amount so as to bring the roller 108 into engagement with the next index notch 90*a* on this wheel, the lever 94 moves back to its normal position shown in FIG. 7, and the spring 142 is increased in tension so that the control slide 192 is accurately positioned corresponding to the position of the new control element 182*a*.**

While the above-described arrangement is effective to provide memory fine tuning for both VHF and UHF channels, it is necessary to provide electrical switching so that the VHF tuner portion 20 can function in a normal manner in 12 of the 24 positions and can also act as an IF amplifier for the UHF signal in the other 12 interspersed UHF positions of the shaft 56. This is accomplished in accordance with a further important aspect of the present invention, by shaping the stator contacts 66 (FIGS. 8, 9, 21 and 22) so that they will establish connection to the contact portions 64 on one of the tuning sticks 62 in a VHF position, but will be completely disconnected from the tuning sticks 62 in the interposed UHF positions. More particularly, each of the stator contacts 66 which is arranged to engage one of the contact portions **64*a* to 64*i*, inclusive, on a particular tuning stick 62, is provided with a relatively narrow protruding center portion 280 (FIG. 8) so that the stator contact will be engaged by one of the contact portions 64 of a tuning stick 62 when the selector shaft 56 is in a VHF position (FIGS. 21 and 22) but will be disconnected from the contact portions 64 of adjacent tuning sticks 62 when the shaft is in one of the UHF tuning positions, as shown in FIGS. 8 and 9. In this connection, it is pointed out that the stator bar 68 includes a grounding stator contact 282 which is adapted to engage the scalloped edge portion of the metal positioning disc 60 so as to establish a ground connection to this disc in all 24 positions of the shaft 56. Accordingly, the stator contact 282 is suitably shaped, as shown in FIG. 8, so that it will engage two adjacent scallops of the disc 60 between which is positioned the active tuning stick 62 (FIG. 21) and the contact 282 will also engage one scallop of the disc 60 in the UHF positions of the shaft 56.**

From the above, it will be seen that when the selector shaft 56 is in one of the twelve UHF positions, all of the stator contacts **66*a* to 66*i*, inclusive, which are spaced along the length of the stator bar 68, are disconnected from the corresponding contacts 64*a* to 64*i*, inclusive, of each of the tuning sticks 62. In accordance with a further important aspect of the present invention, the 40-megacycle IF tuning coils which are required to tune the RF amplifier stage and the mixer stage of the VHF tuner portion 20 to an intermediate frequency of approximately 40 megacycles, are not included on any one of the tuning sticks 62, but instead are permanently connected into the electrical circuitry of the VHF tuner portion. Accordingly, whenever the sticks 62 are disconnected, i.e., in each of the UHF positions of the shaft 56, the VHF tuner portion is automatically conditioned to act as a 40-megacycle IF amplifier. In considering this aspect of the invention, it will be helpful to refer to FIG. 15 of the drawings, wherein an electrical schematic diagram of a suitable VHF tuner portion 20 and UHF tuner portion 21** of the combined VHF and UHF television tuner of the present invention, is shown.

In order to facilitate an understanding of the operation of the VHF tuner section, a description of this section during VHF reception will first be given, i.e., the condition when selector shaft 56 is in one of the twelve VHF positions, and the stator contacts **66*a* to 66*i*, inclusive, are connected to the corresponding contacts 64a to 64i, inclusive, of one of the VHF tuning sticks 62. More particularly, the VHF television signals are received by a suitable antenna system 290 and are supplied to a balanced antenna input network indicated generally at 292. From this network, the signals are transmitted through a selective filter network, indicated generally at 294, to the stator contact 66*b*. The stator contact 66*c* is connected to ground, and the stator contact 66*a* is connected through a capacitor 296 to the control grid of the RF amplifier tube 298, this control grid also being connected through a resistor 300 to an AGC terminal 302** to which a suitable automatic gain control voltage may be applied from the television receiver proper, as will be readily understood by those skilled in the art.

The plate of the amplifier tube 298 is connected through a 40-megacycle IF tuning coil 304 and a resistor 306 to the B plus terminal 398. The plate of the tube 298 and one end of the tuning coil 304 are also permanently connected to the stator contact **66*e* and through a shunting resistor 310 to the stator contact 66*d*. Stator contact 66d is connected through a small neutralizing capacitor 312 to the grid of the tube 298 and is also connected to the bottom end of the tuning coil 304**.

The tuning coil 304 is electromagnetically coupled with a 40-megacycle IF tuning coil 316, the bottom end of which coil is connected to the grid of a mixer tube 318 and the stator contact **66*g*. The upper end of the tuning coil 316 is permanently connected to the stator contact 66*f* and through a feedthrough capacitor 320 to ground. A grid leak resistor 322 is connected between the control grid and cathode of the mixer tube 318, the screen grid of this tube is coupled through a decoupling inductance 324 and a resistor 325 to the B plus terminal 326, and the plate of the tube 318 is connected through a 40-megacycle IF output coil 328 and a resistor 330 to the B plus terminal 326. A capacitor 332 serves to couple the 40-megacycle IF signal to the IF output terminal 334**.

The local oscillator stage of the VHF tuner portion 20 comprises an oscillator tube 340, the cathode of which is connected to ground and the plate of which is connected to the stator contact 66i. The plate of the tube 340 is coupled through a feedback capacitor 342 to the control grid of this tube, and this control grid is connected to ground through a resistor 344. The plate of the tube 340 is also connected through the fine tuning inductance coil 266, described heretofore, and a capacitor 346 to the stator contact **66*h* and through a further capacitor 348 to the control grid of the tube 340. B plus voltage for the plate of the oscillator tube 340 is supplied from the terminal 326 through a resistor 350, the stator contact 66*h*, the contacts 64*h* and 64*i* and the oscillator tuning coil 62*e* on one of the tuning sticks 62, and the stator contact 66*i* to the plate of the tube 340. The desired oscillator injection to the grid of the mixer tube 318 may be accomplished by coupling between the coils 62*e* and 62*d*** on the stick, or by any suitable capacitor coupling arrangement.

In the UHF tuner portion 21, the UHF television signals are received by a suitable UHF antenna system indicated generally at 352. The UHF tuner portion 21 includes an RF tuning compartment **21*a*, a mixer compartment 21b and a local oscillator compartment 21*c*. Within the compartment 21a there is provided an input coupling loop 354 to which the received UHF signals are supplied, the loop 354 being coupled to a transmission line tuning element 356 which is tuned by means of a variable capacitor 358 connected between the ungrounded end thereof and ground. An alignment capacitor 360 is provided for initial alignment of the RF stage over the UHF band. The particular UHF signal which is selected by tuning of the capacitor 358 is coupled to the mixer compartment 21*b* by means of a coupling loop arrangement indicated generally at 362. In the compartment 21*b* the transmission line element 364 is tuned by means of the variable capacitor 366 and an alignment capacitor 368 is likewise provided. In the oscillator compartment the transmission line element 370 is tuned by means of the variable capacitor 372 and an alignment capacitor 374 is provided. In the compartment 21c the local oscillator stage comprises a transistor 376 which is connected to the oscillator tuning circuit through the capacitor 377 and is suitably biased to develop oscillations, as will be readily understood by those skilled in the art. Local oscillator energy developed in the oscillator tuning circuit is coupled by means of a loop element 382 to the mixer compartment 21b wherein it is mixed with the incoming UHF signal and is detected in a crystal detector 384 which is coupled through an IF tuning coil 386 to the center conductor of a coaxial cable 388. The center conductor of the cable 388 is connected to a tapped point on a 40-megacycle input coil 390 provided in the VHF tuner portion 20. While the UHF local oscillator energy may be developed by a vacuum tube instead of a transistor, it is pointed out that a transistor oscillator is preferable for the arrangement of the present invention in which the UHF local oscillator is continually being turned on in each UHF position and turned off in each VHF position as the shaft 56** is rotated.

In order to supply a B plus potential to the UHF tuner portion 21 so that this tuner will be energized when the selector shaft 56 is in any one of the 12 UHF positions but will not be energized when the shaft is in any one of the 12 VHF positions, there is provided a small additional stator bar 400 (FIG. 8) of insulating material which is supported from the top wall 25 of the VHF chassis by means of a bracket 401 having a pair of legs 402. The stator 400 carries a pair of stator contacts 404 and 406 which are so positioned that they will establish contact with the terminal portions 64*g* and 64*f*, respectively, on an inactive one of the tuning sticks 62 when the shaft 56 is in one of the UHF positions, as shown in FIG. 8. Specifically, it will be seen from this figure that the contacts 404 and 406 engage the terminals 64*g* and 64*f* on the third tuning stick in the clockwise direction beyond the disconnected stator contacts 66*a* to 66*i*, inclusive. Accordingly, when the shaft 56 is in any one of the UHF positions, the mixer input tuning coil 62*d* on one of the inactive sticks 62 is connected between the terminals 404 and 406 on the stator 400. The stator contact 404 is connected through a resistor 408 to the B plus terminal 326 and the stator contact 406 is connected by way of the conductor 410 to the aransistor 376 in the oscillator compartment 21*c* of the UHF tuner portion 21. It will thus be evident that each time the selector shaft 56 is moved to a UHF position one of the inactive sticks 62, and specifically the tuning coil 62*d* thereof, is employed as a connecting element to supply a D.C. operating voltage to the UHF oscillator in the UHF tuner 21 thereby energizing this oscillator so that the UHF tuner portion 21 will produce an IF signal corresponding to the particular UHF station to which the main tuning shaft 40 is tuned at that particular time. In this connection it will be understood that any other tuning coil on one of the inactive sticks may be used to selectively energize the UHF oscillator in only the UHF positions of the shaft 56.

Figures 14, 18, 19:
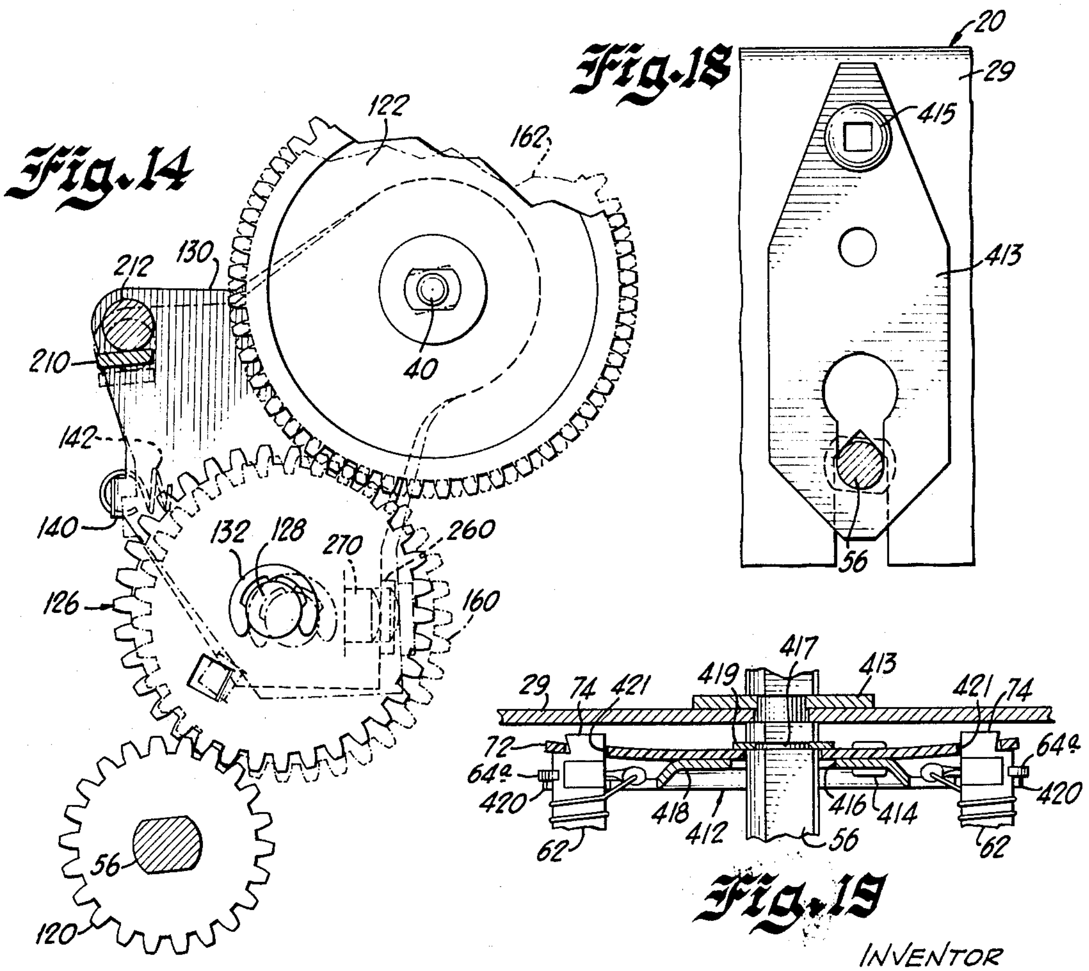
FIG. 14 is a fragmentary view similar to that of FIG. 7 but showing the gears in a different position.
FIG. 18 is a sectional view taken along the lines 18—18 of FIG. 4.
FIG. 19 is a sectional view taken along the lines 19—19 of FIG. 9.

It will be recalled that when the shaft 56 is in any one of the UHF positions, the tuning sticks 62 are completely disconnected from the stator contacts 66*a* to 66*i*, inclusive. This means that the VHF signals normally supplied to the stator contact 66*b* are disconnected from the input of the amplifier tube 298 since this stator contact is not connected to any one of the sticks 62. However, it is still necessary to connect the IF output of the UHF tuner portion 21 to the input of the VHF tuner portion 20 in each of the UHF positions. To accomplish this, a metal switching disc indicated generally at 412 (FIG. 9) is supported on the rear positioning disc 72 by means of eyelets 414. The switching disc 412 is provided with a large clearance opening 416 in the center thereof, so that this disc is not electrically connected to the shaft 56. Also, the disc 412 is provided with a concave center portion 418 and a series of switching fingers 420 which extend radially outwardly between the tuning sticks 62 without touching any of the input coils 62*a* on these sticks. The rear end of the shaft 56 is journalled in a removable plate 413 which is secured to the end wall 29 by means of screws 415. The shaft 56 is provided with a groove 417 which receives a retaining washer 419. The washer 419 holds the disc 72 in place and when the ends of the tuning sticks 62 are positioned in the apertures 421 of the disc 72 this disc is slightly flexed, as best illustrated in FIG. 19.

Due to the offset provided by the concave portion 418 of the disc 412, the switching fingers 420 are positioned along the length of the shaft 56 so that one of them will engage the rear stator contact 66*a* on the stator bar 68 when the shaft 56 is in any one of the UHF positons. Also, a small stator member 422 of insulating material is mounted in an opening 423 in the rear wall 29 of the VHF tuner portion 20 and is provided with a stud portion 424 on which is positioned a suitable retaining washer 426 to hold the stator 422 in place. The stator 422 carries a single stator contact 428 and the stator 422 is positioned on the rear wall 29 of the VHF tuner portion 20 so that the stator contact 428 is connected to another one of the switching fingers of the disc 412 when the shaft 56 is in any one of the UHF positions, such as shown in FIG. 9. Specifically, the stator contact 428 contacts the switching finger 420 which is two fingers away from the finger which contacts the stator contact 66a on the stator bar 68. As a result of this arrangement, whenever the shaft 56 is in a UHF position, an electrical connection is established from the stator contact 428 through the ungrounded disc 412 to the stator contact 66a.

Figure 15:
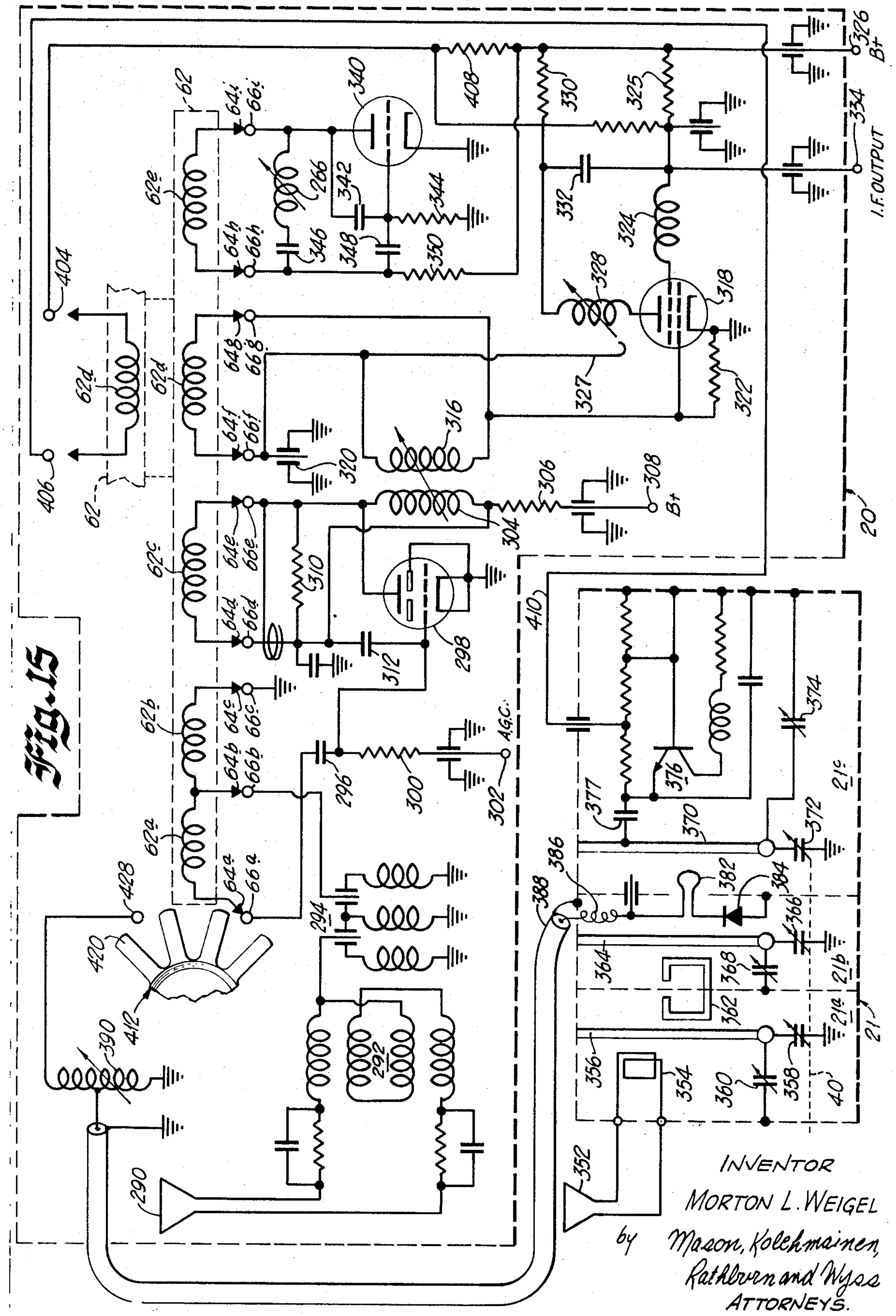
FIG. 15 is a schematic diagram of the electrical circuitry employed in the tuner of FIG. 1.

As shown in FIG. 15, the stator contact 428 is connected to the upper end of the 40-megacycle input coil 390 to which is supplied the IF signal from the UHF tuner portion 21. Accordingly, this IF output signal is connected from the stator contact 428 through the disc 412 and the stator contact 66*a*, and through the capacitor 296 to the input of the RF amplifier tube 298. The coil 390 thus effectively tunes the input circuit of the tube 298 to the 40-megacycle IF signal from the UHF tuner portion 21 and the tube 298 thus acts as a 40-megacycle IF amplifier for this signal whenever the shaft 56 is in one of the UHF positions.

Considering now the manner in which the output circuit of the tube 298 and the input circuit of the tube 318 are tuned to amplify the 40-megacycle IF signal and the local oscillator tube 340 is deenergized when the shaft 56 is in a UHF position, it will be recalled from the previous description that the 40-megacycle tuning coils 304 and 316 which are respectively connected in the plate circuit of the tube 298 and the grid circuit of the tube 318 are permanently connected into the circuit and are not located on any one of the tuning sticks 62. Accordingly, whenever the shaft 56 is moved to a UHF position and the stick contacts 64*a* to 64*i*, inclusive, on any one of the sticks 62 are all disconnected from the stator contacts 66*a* to 66*i*, inclusive, the output circuit of the tube 298 is tuned to the 40-megacycle IF frequency by the coil 304, and this output signal is coupled to the coil 316 which tunes the input of the tube 318 to the same IF signal frequency Since the plate circuit of the mixer tube 318 is normally tuned to the IF signal when operated as a mixer, both of the tubes 298 and 318 then act as 40-megacycle if amplifiers whenever the shaft 56 is in a UHF position.

In order to provide neutralization for the tube 318 when this tube is operated as a 40-megacycle IF amplifier, a conductor 327 is connected from the upper end of the coil 316 to a point in proximity to but not touching the plate circuit of the tube 318. The conductor 327 thus provides a small amount of feedback to the grid circuit of the tube 318 and stabilizes this tube for 40 megacycle operation, as will be readily understood by those skilled in the art.

When the shaft 56 is in any one of the twelve VHF positions, the coils 304 and 316 are shunted by the appropriate coils on one of the tuning sticks 62 so as to tune the output circuit of the tube 298 to the desired VHF station and similarly tune the input of the tube 318 to this VHF station. More particularly, when the shaft 56 is in a VHF position, the tuning coil 62*c* is connected in parallel with the 40-megacycle IF coil 304. When two inductance coils are connected in parallel, the combined inductance of the two coils is always less than the inductance of either of the coils separately.

Accordingly, when the coil 62*c* is connected across the coil 304, the total place circuit inductance of the tube 298 is reduced so that with substantially the same circuit capacities, the plate circuit of the tube 298 will tune to a fequency higher than the 40 megacycle IF frequency, i.e., to the frequency of one of the VHF television channels. In a similar manner, when the coil 62*d* is connected across the coil 316, the parallel combination of these two coils will be an inductance of smaller value which will be effective to tune the input circuit of the tube 318 to the higher frequency of the desired VHF channel. Obviously, the coils on each one of the sticks 62 are wound with an appropriate number of turns so that when combined with the permanently connected 40 megacycle IF coils 304 and 316, the combined inductance will be appropriate to tune to the desired VHF channel corresponding to a particular stick.

In the arrangement of the present invention, the permanent connection of the IF coils 304 and 316 between the plate circuit of the tube 298 and the grid circuit of the tube 318 has the additional advantage that sufficient coupling between these two coils may be provided by appropriate design thereof, so that the necessary band width of 4.5 megacycles can be obtained for even the low-frequency VHF channels. Preferably, the coils 304 and 316 are wound on a common coil form and may be wound relatively close together so as to provide an overcoupled band pass circuit which will give the necessary band width. The close coupling between the coils 304 and 316 will function to provide adequate coupling not only when these 40-megacycle coils are being used alone during UHF reception, but also when the tuning coils 62*c* and 62*d* are connected thereacross during VHF reception.

In conventional VHF television tuners, only the coils 62*c* and 62*d* on the tuning stick itself are employed to provide coupling and it is difficult to obtain good coupling between these coils due to the fact that the terminals 64*e* and 64*f* are positioned on the stick between these coils. This inherently means that relatively poor coupling can be provided on the stick itself between the tuning coils 62*c* and 62*d* and difficulties are experienced in getting adequate band width with such an arrangement, particularly on the low frequency VHF stations. However, in accordance with the arrangement of the present invention, the more adequate coupling afforded by the permanently connected coils 304 and 316 means that adequate coupling to provide the necessary band width is provided on all of the VHF channels, as well as when the coils 304 and 316 are used alone for the 40megacycle IF signal in the UHF positions of the shaft 56.

When the shaft 56 is in any one of the UHF positions, and the stator contacts 66*H* and 66*I* are disconnected from the corresponding terminals 64*H* and 64*I* on any one of the tuning sticks 62, the B plus potential for the oscillator tube 340 is removed from the plate of this tube since the D.C. path through the tuning coil 62e is removed and the condenser 346 effectively blocks the transfer of D.C. through the fine tuning coil 266 to the plate of the tube 340. Accordingly, the local oscillator in the VHF tuner portion 20 is deenergized in each of the UHF positions so that the oscillations normally generated thereby do not interfere with the operation of the tube 318 as a 40-megacycle if amplifier for the UHF IF signal.

From the foregoing description, it will be evident that the combined VHF and UHF tuner of the present invention will function to select any one of the 12 VHF television channels and any one of 12 active UHF channels in a particular area by merely rotating the shaft 56 to one of the 24 positions established by the detent wheel 90. Furthermore, after these VHF and UHF channels have been precisely tuned by the abovedescribed adjustment of the knob 83, selection of a particular VHF or UHF channel can be made by merely rotating the channel selector shaft 56. Accordingly, the tuner of the present invention is arranged so that a motor drive mechanism may be attached to the shaft 56 to permit the remotely controlled selection of any VHF or UHF channel. However, since the drive arrangement between the selector shaft 56 and the main UHF tuning shaft 40 is a 2 to 1 reduction, a stop must be provided for the shaft 56 so that this shaft cannot be rotated more than 360°. This stop is necessary due to the fact that the capacitive tuning elements in the UHF tuner portion 21 rotate only through 180 degrees to cover the entire UHF band, and if the shaft 40 is permitted to rotate beyond 180°, the capacitive elements would be moved out of their normal tuning range and would not be positioned correctly for receiving the desired UHF signals. On the other hand, if rotation of the shaft 57 is limited to slightly less than 360°, then the main UHF tuning shaft 40 is never rotated more than 180° and always remains within the correct range to cover the entire UHF tuning band.

A stop for limiting movement of the shaft 56 is provided by means of a lug portion 440 (FIG. 12) which is struck out of and projects forwardly from the main mounting bracket 32. The lug 440 is positioned in the path of a lug 442 which is formed on the rear surface of the index wheel 90 secured to the selector shaft 56. Accordingly, the shaft 56 may be rotated until the lug 442 strikes the lug 440 in either direction, thereby limiting travel of the shaft 56 to somewhat less than 360°. In this connection, it will be understood that the lug 440 is positioned so that the shaft 56 is free to occupy any one of the 24 detented positions established by the index wheel 90.

When a stop is provided for the shaft 56, it is then necessary to employ a bi-directional motor drive arrangement for remotely-controlled tuning of the VHF-UHF of the ofthe present invention. In accordance with a further aspect of the invention, this motor drive mechanism and its associated control arrangement may be mounted on the rear extension of the selector shaft 56, this mechanism and control arrangement being indicated generally in FIG. 1 at 444.

FIG. 16 shows schematically and somewhat diagrammatically a suitable control arrangement and motor drive mechanism 444 for remote control of the selector shaft 56 so that any VHF or UHF channel in a given area may be selected remotely. Referring to FIG. 16, a remote control drum 446 is secured to the station selector shaft 56 so that the drum 446 rotates with this shaft. About the periphery of the drum 446, there is provided a series of twenty-four apertures 448 within which may be positioned a plurality of station control members 450 in the form of pins which may be inserted into the apertures 448 in any suitable manner and are provided with rounded head portions.

A follower member 452 is mounted on the end of a flexible switch arm 454 which carries a switch contact 456 and cooperates with another switch contact 458 on a second switch arm 460. The station selector pins 450 are inserted into the apertures 448 in the drum 446 in those positions of the shaft 56 which correspond to the VHF and UHF channels which are to be received in the particular television reception area under consideration. Furthermore, the follower member 452 is positioned relative to the drum 446 so that the switch contacts 456, 458 will be opened when the follower 452 engages one of the pins 450, but these contacts will be closed in those positions in which no pin 450 is provided. A suitable source of electrical power is applied between the input terminals 462 and 463 of the motor control mechanism, and the terminal 463 is connected to the movable arm of a toggle actuated reversing switch indicated generally at 465. The bi-directional driving motor of the remotely controlled drive mechanism 444 includes a pair of windings 464 and 466 for driving the motor in opposite directions, and the shaft of this motor is interconnected with the selector shaft 56 by means of a speed reduction mechanism so that the shaft 56 may be driven at a relatively slow speed and may be stopped at any one of the 24 detent positions established by the index wheel 90. For example, a motor drive arrangement such as shown and described in copending Meadows, et al application Ser. No. 459,507, filed May 11, 1957, now issued as U.S. Pat. No. 3,247,437 and assigned to the same assignee as the present invention, may be employed if desired.

The reversing switch 465 is necessary so that the drive motor may be reversed just prior to the point at which the lug 442 engages the lug 440 to provide a positive stop for the shaft 56. To this end, a control arm 470 is secured to the shaft 56 by any suitable arrangement and is arranged to rotate with this shaft as the same is driven by the bi-directional drive motor. A pivotally mounted toggle actuating lever 472 is mounted in the path of the arm 470 and is arranged to be struck on either side by the arm 470 in the area of engagement of the lugs 440 and 442. Accordingly, just prior to engagement of these lugs, the arm 470 engages the toggle arm 472 and actuates the reversing switch 465 to connect the other winding of the motor so that this motor will be driven in the opposite direction and will not drive the shaft 56 against the positive stop provided for this shaft.

In order to start the remotely controlled driving mechanism, a starting switch 474 is provided which is connected across the switch contacts 456 and 458. When the switch 474 is closed, one of the windings 464 or 466 is energized from the power terminals 462 and 463 so that the motor drives the shaft 56 in one direction. As the shaft 56 is driven, the drum 446 rotates so that the active pin 450 is moved away from the follower 452 and permits the switch contacts 456 and 458 to be closed. When these contacts are closed a holding circuit is established for continuing the energization of the drive motor even though the remote switch contacts 474 are thereafter opened. The motor continues to rotate the shaft 56 until the next active pin moves into engagement with the follower 452 and opens the switch contacts 456, 458.

Accordingly, a remotely controllable motor drive mechanism is provided for the shaft 56 so that any VHF or UHF channel in the reception area can be programmed on to the drum 446 and can be automatically selected at a remote point by closure of the switch 474.

In FIGS. 23 to 25, inclusive, of the drawings, there is illustrated an alternative embodiment of the present invention wherein a different arrangement is employed for switching in the 40-megacycle IF coils in each of the twelve UHF positions of the station selector shaft 56.

Referring to these figures, a series of 4 hub members of insulating material 500, 501, 502 and 503 are mounted on the selector shaft 56 in spaced relation along the length thereof. Each of the hubs 500–503, inclusive, carries a metal plate provided with a plurality of radially extending switching arm portions similar to the arms 420 of the switching plate 412 in the embodiment previously described. More particularly, the metal plate 504 is mounted on the hub 500 by means of the rivets 506, the metal plate 508 is mounted on the hub 501 by means of the rivets 510, the plate 512 is mounted on tbe hub 502 by means of the rivets 514, and the plate 516 is mounted on the hub 503 by means of the rivets 518. The hub portions 500–503, inclusive, are positioned along the length of the selector shaft 56 so that the plates 504, 508, 512 and 516 are in alignment with the stator contacts 66*d*, 66*e*, 66*f* and 66*g*, respectively, which are positioned on the stator bar 68. Accordingly, in the UHF positions of the shaft 56, one switching arm portion 504*a* of the switching plate 504 is connected to the stator contact 66*d*, one switching arm portion 508*a* of the plate 508 is connected to the stator contact 66*e*, one switching arm portion 512*a* of the plate 512 is connected to the stator contact 66*f*, and one switching arm portion 516*a* is connected to the stator contact 66*g*.

In the alternative embodiment of FIGS. 23 to 25, inclusive, the 40-megacycle IF coils are arranged to rotate with the station selector shaft 56 and are electrically connected to the switching plates 504, 508, and 512, 516. As a result, whenever the shaft 56 is moved to a UHF position, the 40-megacycle coils are connected to the required stator contacts through the switching arm portions of the plates 504, 508 and 512, 516. More particularly, a coil form of insulating material 520 is mounted in the hubs 501 and 502 and extends therebetween, the switching plates 508 and 512 being provided with offset center portions to accommodate this coil form, as best illustrated in FIG. 25. The 40-megacycle IF coil which is required for the plate of the RF tube 298 (FIG. 15) is wound on the coil form 520 and is indicated as the coil 304*a*. One end of this coil is connected to the plate 508 as indicated by the solder connection 522. The other end of this coil extends through the hollow coil form 520 and is connected to the plate 504 by means of the solder connection 524. In a similar manner, the 40-megacycle IF coil provided for the grid circuit of the tube 318, which is indicated as the coil 316*a* in FIG. 25, is wound on the coil form 520. One end of this coil is connected to the plate 512 as indicated at 526, and the other end of this coil extends through the coil form 520 and is connected to the plate 516 at 528. With such an arrangement the coils 304*a* and 316*a* may be wound relatively close together on the coil form 520 so that the desired degree of coupling may be achieved between these coils to provide the correct band pass circuit for 40-megacycle operation of the tuner in the UHF positions of the shaft 56.

It will be understood that in the VHF positions of the shaft 56 the terminal head portions 64*d*, 64*e*, 64*f* and 64*g* are connected to the stator contacts 66*d*, 66*e*, 66*f* and 66g, respectively and in such VHF positions the 40-megacycle coils 304a and 316a are not connected into the circuit at all due to the fact that the switching plates 504, 508, 512 and 516 are not connected to any of the stator contacts in the VHF positions of the shaft 56. Accordingly, the design of the tuning coils 62c and 62d on each of the tuning sticks 62 is somewhat different in the embodiment of FIGS. 23–25, inclusive, since the 40-megacycle coils are not continuously in the circuit in this alternative embodiment as they are in the embodiment first described herein. In other respects, the alternative embodiment of FIGS. 23–25, inclusive, is substantially the same as described in detail heretofore. It will be understood that the switching plate 412 functions to switch the 40-megacycle input from the UHF tuner 21 to the input of the tube 298 in the alternative embodiment of FIGS. 23–25, inclusive, in a manner similar to that discussed in detail heretofore. Also, the local oscillator 340 is deenergized in the UHF positions due to the fact that the stator contacts 66h and 66i are not connected to any one of the tuning sticks in the UHF positions of the shaft 56.

In FIG. 26 of the drawings, there is shown a further alternative embodiment of the present invention wherein a different arrangement is employed for switching the 40-megacycle IF coils into the circuit in the UHF positions of the station selector shaft 56. Referring to this figure, the stator bar 68a of this alternative embodiment is of somewhat different configuration in that the stator contacts such as the stator contact 540, which corresponds to the stator contact 66g in the alternative embodiment of FIGS. 23–25, is in the form of an elongated cantilever mounted switch arm having an offset crimp portion 542 formed intermediate the ends thereof. In a VHF position the portion 542 is adapted to engage one of the contact portions, such as the contact portion 64g, on the active tuning stick 62. The outer free end of the stator contact 540 carries a contact member 544 and a cooperating contact member 546 is mounted on an insulating standoff 548 which is in turn mounted by any suitable means on the deck portion 25 of the VHF tuner chassis 23. An actuating plate 550 of insulating material is mounted on the selector shaft 56 and is provided with a plurality of radially extending arm portions 552 which project radially outwardly farther than the contact portions, such as the portion 64g, of the tuning sticks 62.

When the shaft 56 is moved to any one of the 12 UHF positions, one of the arms 552 engages the crimp portion 542 of the stator contact arms 540 and moves this stator contact outwardly so that the contacts 544 and 546 are closed. Also, in a UHF position of the shaft 56 the contact portions on the tuning sticks 62 are removed from the vicinity of the crimp portion 542 in the same manner as illustrated in FIG. 9 in connection with the previously described embodiment. In this connection, it will be understood that the actuating plate 550 is positioned on the shaft 56 in alignment with the contact portions 64g of the tuning sticks 62, in a manner similar to the way in which the switching plate 516 is aligned with the contact portions 66g on the tuning sticks in the embodiment of FIGS. 23–25, inclusive. However, as stated heretofore, the actuating plate 550 is of insulating material and merely functions to cause the contacts 544 and 546 to close whenever the selector shaft 56 is turned to a UHF position. A 40-megacycle tuning coil 316b, which corresponds to the coil 316a of the embodiment of FIGS. 23–25, inclusive, is physically supported in any suitable manner from the VHF tuner chassis and one end of this coil is connected to the contact 546 as indicated by the connection point 554.

In the alternative embodiment of FIG. 26, the stator contact 540 corresponds to the stator contact 66g in the first described embodiment (FIG. 15) wherein this stator contact is connected to the grid of the tube 318. When the shaft 56 is in a UHF position and the contacts 544 and 546 are closed, as described heretofore, the coil 316b is connected to the stator contacts 540 and hence to the grid of the tube 318. The bottom end of the coil 316b may be connected directly to ground, i.e., the chassis deck 25. In the alternative, the bottom end of the coil 316b may be connected through a capacitor 556 to ground to provide D.C. isolation if such is desired.

In order to switch in the 40-megacycle coil corresponding to the coil 304, which is connected to the plate of the tube 298 in FIG. 15, a pair of stator contacts similar to the stator contact 540 are employed in place of the stator contacts 66d and 66e in the embodiment described heretofore. Each of these stator contacts is provided with a contact similar to the contact 544 which cooperates with a fixed contact supported on an insulated standoff similar to the standoff 548. The 40-megacycle IF coil corresponding to the coil 304 is then permanently connected between these two standoffs and is electrically connected to the contacts 546 thereof. Accordingly, when the shaft 56 is in a UHF position, this 40-megacycle IF coil is connected to the corresponding stator contacts in place of one of the tuning sticks 62 due to the switching action of the actuating plates 550, in a manner identical to that described heretofore in connection with the stator contact 540.

It will also be understood that the two 40-megacycle IF coils, which are both fixedly mounted in the embodiment of FIG. 26, are preferably arranged on the same coil form so that the desired degree of coupling between these coils may be achieved to provide the correct bandpass characteristic for 40 megacycle operation.

It will also be understood that in the alternative embodiment of FIG. 26 the 40-megacycle output from the UHF tuner 21 may be connected to the input of the tube 298 by means of a switching plate similar to the switching plate 412. However, it is also possible to employ a stator contact arrangement similar to the stator contact 540 and to provide a fixed contact supported by an insulated standoff, such as the standoff 548, to accomplish the input circuit switching for the tube 298, as will be readily understood by those skilled in the art.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A television tuner arrangement for receiving signals in both the VHF and UHF television bands, comprising a combined VHF and UHF station selector shaft, detent means for establishing a plurality of VHF positions and a plurality of UHF positions interspersed with at least some of said VHF positions for said station selector shaft, means including a VHF local oscillator circuit and operative in said VHF positions for receiving signals from different VHF television stations, means including a main UHF tuning shaft which is independent of said VHF local oscillator circuit and operative in said UHF positions for receiving signals from different UHF television stations, a common control member for adjusting both said VHF oscillator circuit and said main tuning shaft for precise tuning to both VHF and UHF stations, and means carried by said station selector shaft and including independently adjustable members corresponding to said VHF and UHF positions for automatically adjusting said common control member to different preset positions.

2. A television tuner as set forth in claim 1, including a control shaft, means responsive to rotation of said control shaft and operative when said station selector shaft is in one of said VHF positions for accurately tuning to the VHF television station corresponding to said one alternate position, and means responsive to rotation of said control shaft and operative when said station selector shaft is in one of said UHF positions for accurately tuning to a signal from a particular UHF television station.

3. A television tuner as set forth in claim 1, including a control shaft, a VHF fine tuning impedance, means responsive to rotation of said control shaft and operative when said station selector shaft is in one of said VHF positions for varying said VHF fine tuning impedance, and means responsive to rotation of said control shaft and operative when said station selector shaft is in one of said UHF positions for selecting a signal from a particular UHF television station within a corresponding group of UHF television stations.

4. A television tuner as set forth in claim 1, wherein said UHF receiving means is operative to receive different groups of UHF stations in different ones of said UHF positions, a combined VHF and UHF fine tuning shaft, and means operative in response to rotation of said fine tuning shaft for selecting a signal from a particular UHF television station within one of said groups and for accurately tuning to a signal from a selected VHF television station.

5. In a television tuner, the combination of, a station selector shaft, a plurality of tuning panels each provided with contact means, means for supporting said panels for rotation with said station selector shaft, a stator member having contact means arranged to engage the contact means on said panels as said station selector shaft is rotated, detent means for establishing a plurality of fixed positions for said station selector shaft, said positions being arranged so that said panels engage said stator member in a first group of said positions and do not engage said stator member in a second group of said positions, means operative when said station selector shaft is in any one of said first group of positions for receiving a signal from a predetermined VHF television station, and means operative when said station selector shaft is in any one of said second group of positions for amplifying an intermediate frequency output signal derived from a preceding UHF tuner.

6. A television tuner as set forth in claim 5, including a plurality of tuned circuits permanently connected to said stator contacts, means including said tuned circuits and operative when said station selector shaft is in any one of said second group of positions for amplifying an intermediate frequency signal of predetermined frequency, and means operative when said station selector shaft is in any one of said first group of positions for receiving a signal from a predetermined VHF television station and converting said received signal into a corresponding intermediate frequency signal of said predetermined frequency.

7. A television tuner as set forth in claim 5, including a plurality of conductive switching members positioned along the length of said selector shaft and extending radially outwardly therefrom, said switching members being in alignment with predetermined ones of said stator contacts, a plurality of tuning coils electrically connected to said switching members and being rotatable with said selector shaft, said switching members having means for connecting said tuning coils to said predetermined stator contacts in each of said second group of positions, means including said tuning coils and operative when said station selector shaft is in any one of said second group of positions for amplifying an intermediate frequency signal of predetermined frequency, and means operative when said station selector shaft is in any one of said first group of positions for receiving a signal from a predetermined VHF television station and converting said received signal into a corresponding intermediate frequency signal of said predetermined frequency.

8. A television tuner as set forth in claim 5, including a plurality of stationary tuning coils, means for connecting said tuning coils to predetermined ones of said stator contacts only when said selector shaft is in any one of said second group of positions, means including said tuning coils and operative when said station selector shaft is in any one of said second group of positions for amplifying an intermediate frequency signal of predetermined frequency, and means operative when said station selector shaft is in any one of said first group of positions for receiving a signal from a predetermined VHF television station and converting said received signal into a corresponding intermediate frequency signal of said predetermined frequency.

9. A television tuner as set forth in claim 5, including a plurality of tuned circuits permanently connected to said stator contacts, an intermediate frequency input circuit, switch means for connecting said intermediate frequency input circuit to said stator member during periods when said station selector shaft is in any one of said second group of positions, means including said tuned circuits and said intermediate frequency input circuit and operative when said station selector shaft is in any one of said second group of positions for amplifying an intermediate frequency signal of predetermined frequency, and means operative when said station selector shaft is in any one of said first group of positions for receiving a signal from a predetermined VHF television station and converting said received signal into a corresponding intermediate frequency signal of said predetermined frequency.

10. A television tuning arrangement for receiving signals in both the VHF and UHF television bands, comprising a combined VHF and UHF station selector shaft, detent means for establishing 24 equally spaced positions for said station selector shaft, VHF tuner means operative in alternate ones of said positions for receiving signals from different VHF television stations, a UHF tuner provided with a main tuning shaft, means in said UHF tuner and responsive to rotation of said main tuning shaft for receiving signals from different UHF television stations and converting the same to corresponding signals of an intermediate frequency, said UHF stations being divided into twelve groups, means in said VHF tuner and operative in the twelve remaining positions of said station selector shaft for amplifying signals of said intermediate frequency, a driving gear on said station selector shaft, a driven gear on said main tuning shaft, an idler gear interconnecting said driving and driven gears, whereby said main tuning shaft is positioned for reception of signals in different ones of said groups of UHF television stations when said station selector shaft is moved to different ones of said 12 remaining positions, means operative in said twelve remaining positions for connecting the output of said UHF tuner to the input of said VHF tuner, and means for moving said idler gear while maintaining the same in engagement with said driving gear, thereby to provide a fine tuning adjustment of said main tuning shaft.

11. A television tuner for receiving signals in both the VHF and UHF television bands, comprising a combined VHF and UHF station selector shaft, detent means for establishing 24 equally spaced positions for said station selector shaft, VHF tuner means operative in alternate ones of said positions for receiving signals from different VHF television stations, a UHF tuner provided with a main tuning shaft, means in said UHF tuner and responsive to rotation of said main tuning shaft for receiving signals from different UHF television stations and converting the same to corresponding signals of an intermediate frequency, said UHF stations being divided into twelve groups, means in said VHF tuner and operative in the 12 remaining positions of said station selector shaft for amplifying signals of said intermediate frequency, a driving gear on said station selector shaft, a driven gear on said main tuning shaft, an idler gear interconnecting said driving and driven gears, whereby said main tuning shaft is positioned for reception of signals in different ones of said groups of UHF television stations when said station selector shaft is moved to different ones of said 12 remaining positions, means operative in said twelve remaining positions for connecting the output of said UHF tuner to the input of said VHF tuner, and means for moving said idler gear in the arc of a circle having as its center the axis of said main tuning shaft while maintaining the teeth of said idler gear in engagement with the teeth of said driving gear, thereby to provide a fine tuning adjustment of said main tuning shaft.

12. A television tuner for receiving signals in both the VHF and UHF television bands, comprising a combined VHF and UHF station selector shaft, detent means for establishing 24 equally spaced positions for said station selector shaft, VHF tuner means operative in alternate ones of said positions for receiving signals from different VHF television stations, a UHF tuner provided with a main tuning shaft, means in said UHF tuner and responsive to rotation of said main tuning shaft for receiving signals from different UHF television stations and converting the same to corresponding signals of an intermediate frequency, said UHF stations being divided into 12 groups, means in said VHF tuner and operative in the 12 remaining positions of said station selector shaft for amplifying signals of said intermediate frequency, a driving gear on said station selector shaft, a driven gear on said main tuning shaft, an idler gear interconnecting said driving and driven gears, whereby said main tuning shaft is positioned for reception of signals in different ones of said groups of UHF television stations when said station selector shaft is moved to different ones of said 12 remaining positions, means operative in said 12 remaining positions for connecting the output of said UHF tuner to the input of said VHF tuner, and means for moving said idler gear in the arc of a circle having as its center the axis of said main tuning shaft, said driving gear being restrained by the action of said detent means so that said movement of said idler gear produces a slow speed adjustment of said main tuning shaft to permit selection of a particular UHF television station within the group selected by adjustment of station selector shaft.

13. A television tuning arrangement comprising, a VHF tuner having a station selector shaft, detent means for establishing a plurality of different positions for said station selector shaft, a UHF tuner provided with a main tuning shaft, a first gear secured to said station selector shaft, gear means interconnecting said first gear and said main tuning shaft and arranged to position said main tuning shaft for reception of signals from different groups of UHF television stations when said station selector shaft is moved to different ones of said positions, and means for providing a vernier adjustment of said main tuning shaft while said first gear remains fixed in one of said positions, thereby to permit selection of a signal corresponding to a particular UHF television station within a selected group of UHF television stations.

14. A television tuner as set forth in claim 13, including a driving gear on said station selector shaft, a driven gear on said main tuning shaft, an idler gear interconnecting said driving and driven gears, whereby said main tuning shaft is positioned for reception of signals from different groups of UHF television stations when said station selector shaft is moved to different ones of said positions, and means for moving said idler gear in the arc of a circle having as its center the axis of said main tuning shaft, said driving gear being restrained by the action of said detent means so that said movement of said idler gear produces a vernier adjustment of said main tuning shaft to permit selection of a particular UHF television station within the group selected by adjustment of said station selector shaft.

15. A television tuner arrangement for receiving signals in both the VHF and UHF television bands, comprising a combined VHF and UHF station selector shaft, detent means for establishing a plurality of VHF positions and a plurality of UHF positions for said station selector shaft, means operative in said VHF positions for receiving signals from different VHF television stations, means operative in said UHF positions for receiving signals from different UHF television stations, and means carried by said station selector shaft for automatically adjusting the tuning of said VHF signal receiving means and said UHF signal receiving means to a preset value in all of said VHF and UHF positions of said station selector shaft.

16. The television tuner arrangement as set forth in claim 15, wherein said adjusting means includes a plurality of independently adjustable members one for each of said VHF and UHF detent positions, and means including a control shaft concentric with said station selector shaft for individually adjusting any one of said members to obtain a desired fine tuning adjustment of said VHF and UHF signal receiving means.

17. A television tuner arrangement for receiving signals in both the VHF and UHF television bands, comprising a combined VHF and UHF station selector shaft, detent means for establishing 24 equally spaced positions for said station selector shaft, VHF tuner means operative in alternate ones of said positions to receive signals from different VHF television stations, UHF tuner means for selectively receiving signals from any one of the television stations within the UHF television band and developing an intermediate frequency signal corresponding to said received signal, and means operative in the positions between said alternate positions for adjusting said UHF tuner means to receive signals from different UHF television stations within said UHF band and for amplifying the corresponding intermediate frequency signal in said VHF tuner means.

18. In a television tuner, the combination of, a station selector shaft, a plurality of tuning panels each provided with contact means, means for supporting said panels for rotation with said station selector shaft, a stator member having contact means arranged to engage the contact means on said panels as said station selector shaft is rotated, detent means for establishing a plurality of fixed positions for said station selector shaft, said positions being arranged so that said panels engage said stator member in a first group of said positions and do not engage said stator member in a second group of said positions, a plurality of tuned circuits permanently connected to said stator contacts, means including said tuner circuits and operative when said station selector shaft is in any one of said second group of positions for amplifying an intermediate frequency signal of predetermined frequency, and means operative when said station selector shaft is in any one of said first group of positions for receiving a signal from a predetermined VHF television station and converting said received signal into a corresponding intermediate frequency signal of said predetermined frequency.

19. In a television tuner, the combination of, a station selector shaft, a plurality of tuning panels each provided with contact means, means for supporting said panels for rotation with said station selector shaft, a stator member having contact means arranged to engage the contact means on said panels as said station selector shaft is rotated, detent means for establishing a plurality of fixed positions for said station selector shaft, said positions being arranged so that said panels engage said stator member in a first group of said positions and do not engage said stator member in a second group of said positions, a plurality of tuning coils rotatable with said selector shaft, means for connecting said tuning coils to predetermined ones of said stator contacts in each of said second group of positions, means including said tuning coils and operative when said station selector shaft is in any one of said second group of positions for amplifying an intermediate frequency signal of predetermined frequency, and means operative when said station selector shaft is in any one of said first group of positions for receiving a signal from a predetermined VHF television station and converting said received signal into a corresponding intermediate frequency signal of said predetermined frequency.

20. A television tuner arrangement for receiving signals in both the VHF and UHF television bands, comprising combined VHF and UHF station selector shaft, detent means for establishing a first group of VHF station selecting positions of said selector shaft and a second group of UHF station selecting positions of said selector shaft, a tuning coil rotatable with said selector shaft, a plurality of stationary contacts, means for connecting said tuning coil to said contacts in each of said second group of UHF station selecting positions of said selector shaft, and means including said tuning coil and operative when said selector shaft is in any one of said second group of positions for amplifying an intermediate frequency signal of predetermined frequency.

21. The combination of claim 20, wherein said connecting means includes a plurality of conductive switching members positioned along the length of said selector shaft and extending radially therefrom, said switching members being in alignment with predetermined ones of said stationary contacts and connected to the ends of said tuning coil.

22. In a television tuner, the combination of, a station selector shaft, a plurality of tuning adjustment screws extending radially from said shaft and rotatable therewith, a detent wheel secured to said shaft and having a plurality of notches corresponding to the positions in which said shaft is to be detented, a follower member adapted to engage the outer ends of different ones of said adjustment screws when said selector shaft is rotated to different ones of said positions, a pivotally mounted detent arm having a portion in engagement with the periphery of said detent wheel whereby said arm moves from a first position to a second position and back to said first position as said arm moves from one detent notch to another when said shaft is rotated, and means controlled by the position of said detent arm for biasing said follower into engagement with the outer end of one of said adjustment screws with a predetermined force when said detent arm is in said first position and for reducing said force when said detent arm is in said second position.

23. In a television tuner, the combination of, a station selector shaft, a plurality of tuning adjustment screws extending radially from said shaft and rotatable therewith, means for restraining said selector shaft in any one of a number of station selecting positions, a follower member adapted to engage the outer ends of different ones of said adjustment screws when said selector shaft is rotated to different ones of said positions and means for exerting a force on said follower member tending to hold said follower member in engagement with the outer end of one of said adjustment screws when said shaft is in one of said positions and reducing said force as said shaft moves between said positions, thereby to minimize the shock of engagement of said follower member with different ones of said adjustment screws as said shaft is rotated.

24. In a television tuner, the combination of a station selector shaft having a plurality of VHF station selecting positions and at least one UHF position, a plurality of VHF tuning panels carrying tuning coils and each provided with contact means, means for supporting said panels for rotation with said station selector shaft, a stator member having contact means arranged to engage the contact means on said panels as said selector shaft is rotated to different ones of said VHF positions, said stator member being electrically disconnected from all tuning elements carried by said selector shaft when said selector shaft is in said UHF position, means operative when said selector shaft is in any one of said VHF positions for receiving signals from a predetermined VHF television station, a plurality of tuned circuits permanently connected to said stator contacts, and means including said tuned circuits and operative when said selector shaft is in said UHF position for amplifying an intermediate frequency signal of predetermined frequency.

25. The combination as set forth in claim 24, wherein said last named means includes an intermediate frequency signal terminal, switching means for connecting said terminal to one of the contacts on said stator member, and means for actuating said switching means when said station selector shaft is in said UHF position.

26. The combination as set forth in claim 24, wherein said selector shaft is provided with a plurality of UHF positions, an intermediate frequency signal terminal, switching means for connecting said terminal to one of the contacts on said stator member, and means carried by said selector shaft for actuating said switching means in each of said UHF positions of said selector shaft.

27. The combination as set forth in claim 26, wherein said switching means includes a metal disc carried by and insulated from said selector shaft, said disc having a plurality of radially extending fingers positiond so as to connect said intermediate frequency signal terminal to said one stator contact through said disc in each of said UHF positions of said selector shaft.

28. In a television tuner, the combination of a station selector shaft having a plurality of VHF station selecting positions and at least one UHF position, a plurality of VHF tuning panels carrying tuning coils and each provided with contact means, means for supporting said panels for rotation with said station selector shaft, a stator member having contact means arranged to engage the contact means on said panels as said selector shaft is rotated to different ones of said VHF positions, said stator member being electrically disconnected from all tuning elements carried by selector shaft when said selector shaft is in said UHF position, an RF amplifier, a mixer, tuning means permanently connected in the output of said RF amplifier and in the input of said mixer, means including said tuning means for causing said RF amplifier and mixer to operate as amplifiers for an intermediate frequency signal of predetermined frequency when said selector shaft is in said UHF position, and means connecting said stator contacts to said tuning means so that said tuning coils are successively connected in parallel with said tuning means through said stator contacts as said selector shaft is moved to different ones of said VHF positions.

29. In a television tuner, the combination of a station selector shaft having a plurality of VHF station selecting positions and at least one UHF position, a plurality of VHF tuning panels carrying tuning coils and each provided with contact means, means for supporting said panels for rotation with said station selector shaft, a first stator member having contact means arranged to engage the contact means on said panels as said selector shaft is rotated to different ones of said VHF positions, means including said VHF tuning panels and operative when said selector shaft is in any one of said VHF positions for receiving signals from a predetermined VHF television station, a second stator member having a first contact connected to a source of unidirectional potential and having a second contact connected to a UHF tuner energizing terminal, means operative when said selector shaft is in said UHF position for amplifying an intermediate frequency signal of predetermined frequency, said second stator member being positioned so that said first and second contacts thereof engage contact means on one of said VHF tuning panels when said selector shaft is in said UHF position, and conductive means on said one VHF tuning panel and connecting said contact means engaged by said first and second contacts, thereby to supply potential from said source through said conductive means to said UHF tuner energizing terminal when said selector shaft is in said UHF position.

30. The combination as set forth in claim 29, wherein said selector shaft is provided with a plurality of UHF positions and said source is connected to said UHF tuner energizing terminal through conductive means provided on different ones of said VHF tuning panels in different ones of said plurality of UHF positions.

31. A television tuner arrangement for receiving signals in both the VHF and UHF television bands, comprising a combined VHF and UHF station selector shaft, detent means for establishing a first group of VHF station selecting positions of said selector shaft and a second group of UHF station selecting positions of said selector shaft, means operative in said VHF positions for receiving signals from different VHF television stations, a UHF tuner for receiving signals from UHF television stations and having a main tuning shaft, rotation of which over approximately one hundred eighty degrees covers the UHF television band, means interconnecting said selector shaft and said main tuning shaft so that said UHF tuner is adapted to receive signals from different UHF television stations in each of said UHF positions, means including a driving motor for moving said combined VHF and UHF station selector shaft, and remotely operable control means for said driving motor whereby said selector shaft may be selectively moved to all of said VHF and UHF positions.

32. The combination as set forth in claim 31, wherein alternate ones of the positions of said selector shaft are VHF positions and said UHF positions are individually positioned between said VHF positions.

33. The combination as set forth in claim 31, wherein said VHF positions of said selector shaft occur alternately with said UHF positions of said shaft, means for limiting rotation of said selector shaft to less than 360°, and means for reversing the direction of movement of said selector shaft by said driving motor in accordance with said rotation limiting means.

34. In a television tuner, the combination of, a UHF tuner having a continuously variable main tuning shaft rotation of which is effective selectively to receive signals from all television stations in the UHF television band, a station selector shaft offset from said main tuning shaft, a first gear on said selector shaft, a second gear on said main tuning shaft, a third gear in engagement with said first and second gears, detent means for said selector shaft to establish a plurality of positions thereof corresponding to different groups of UHF stations, and means for moving said third gear in the arc of a circle having as its center the axis of said main tuning shaft while maintaining the teeth of said third gear in engagement with the teeth of said first gear, thereby to provide a fine tuning adjustment of said main tuning shaft to select a particular UHF station within one of said groups of UHF stations.

35. The combination set forth in claim 34 wherein said third gear is rotatably mounted on a plate which is pivotally mounted for movement about the axis of said main tuning shaft, a carrier rotatable with said selector shaft, a plurality of adjustable elements supported by said carrier and movable radially of said selector shaft, and means engageable with individual ones of said adjustable elements for moving said plate to different positions corresponding to the preset positions of said adjustable elements as said selector shaft is rotated.

36. The combination set forth in claim 35 and including a control shaft concentric with said selector shaft and movable longitudinally thereof, gear means on each of said adjustable elements, a driving gear adapted to engage the gear means on one of said elements when said control shaft is moved rearwardly, means normally biasing said driving gear to a forward position in which said driving gear is out of the path of movement of said gear means, and means for rotating said driving gear in response to rotation of said control shaft.

37. A television tuner arrangement for receiving signals in both the VHF and UHF television bands, comprising a combined VHF and UHF station selector shaft, detent means for establishing a first group of VHF station selecting positions of said selector shaft and a second group of UHF station selecting positions of said selector shaft, means operative in said VHF positions for receiving signals from different VHF television stations, UHF tuner for receiving signals from UHF television stations and having a main tuning shaft, rotation of which over approximately one hundred eighty degrees covers the UHF television band, means interconnecting said selector shaft and said main tuning shaft so that said UHF tuner is adapted to receive signals from different UHF television stations in each of said UHF positions, and said interconnecting means including a plurality of individually adjustable members one for each of said UHF positions so that said UHF main tuning shaft is automatically adjusted to different preset positions when said station selector shaft is moved to different ones of said UHF positions.

38. The combination as set forth in claim 37, wherein a control shaft is positioned concentric with said station selector shaft, and means responsive to movement of said control shaft for adjusting one of said individually adjustable members, thereby to change the preset position of said UHF main tuning shaft in the UHF position corresponding to said one adjustable member.

39. The combination as set forth in claim 37, which includes a driving gear normally positioned outside the path of movement of said individually adjustable members at a preset adjustment position with respect to said station selector shaft, and means including a control shaft concentric with said station selector shaft for moving said driving gear into engagement with one of said adjustable members positioned at said preset adjustment position.

40. The combination of claim 37, which includes means interconnecting said control shaft and said driving gear so that rotation of said control shaft when said driving gear is in engagement with said one adjustable member is effective to rotate said one adjustable member and change the preset position of said UHF main tuning shaft.

41. A television tuner arrangement for receiving signals in both the VHF and UHF television bands, comprising a combined VHF and UHF station selector shaft, detent means for establishing a plurality of VHF positions and a plurality of UHF positions for said station selector shaft, means operative in said VHF positions for receiving signals from different VHF television stations, means operative in said UHF positions for receiving signals from different UHF television stations, a first group of individually adjustable members, means including said first group of members for adjusting the tuning of said VHF signal receiving means in each of said VHF positions of said station selector shaft, a second group of individually adjustable members, means including said second group of members for adjusting the tuning of said UHF signal receiving means in each of said UHF positions of said station selector shaft, support means for said first and second group of individually adjustable members connected to and rotatable with said station selector shaft, whereby said VHF signal receiving means and said UHF signal receiving means are automatically tuned to preset values as said station selector shaft is moved to different ones of said VHF and UHF positions, said first and second groups of individually adjustable members moving in predetermined paths about the axis of said station selector shaft as said station selector shaft is rotated, driving means normally positioned outside the paths of movement of said first and second groups of individually adjustable members, and means for causing said driving means to engage and adjust an individually adjustable member in either of said first and second groups, whereby the preset tuning values of both said VHF signal receiving means and said UHF signal receiving means may be altered.

42. The combination as set forth in claim 41, which includes a control shaft concentric with said station selector shaft, and means responsive to movement of said control shaft for causing said drive means to engage and adjust an individually adjustable member in either of said first and second groups.

43. The combination as set forth in claim 42, which includes means responsive to initial rearward movement of said control shaft for engaging said drive means with one of said individually adjustable members in either of said first and second groups, and means responsive to rotation of said control shaft after said initial rearward movement thereof for adjusting said one individually adjustable member.

44. In combination, a UHF tuner having a continuously variable main tuning shaft rotation of which is effective selectively to receive signals from all television stations in the UHF television band, a selector shaft offset from said main tuning shaft, bearing means engaging said selector shaft at spaced points therealong for permitting rotation of said selector shaft while preventing tilting thereof, means on said selector shaft defining a plurality of spaced detent notches, spring biased detent means adapted to engage different ones of said notches as said selector shaft is rotated, thereby to establish a plurality of equally spaced detent positions for said selector shaft, a first gear connected to said main tuning shaft, a second gear, means mounting said second gear so that its axis of rotation is maintained parallel to said first gear, means including said second gear for coupling said selector shaft to said first gear so that said main tuning shaft is moved to different positions established by said detent notches in response to rotation of said selector shaft, a fine tuning member concentric with said selector shaft, a fine tuning knob on said fine tuning member which is arranged to be grasped by the operator to effect a fine tuning operation, and means coupling said fine tuning member to said second gear independently of said detented selector shaft and in such manner that rotation of said fine tuning member causes rotation of said second gear while maintaining the axis of rotation of said second gear parallel to the axis of rotation of said first gear, whereby rotation of said fine tuning member is effective to move said main tuning shaft without changing the position of said detented selector shaft.

45. The combination of claim 44, wherein said concentric fine tuning member is positioned around said selector shaft.

46. In combination, a UHF tuner having a continuously variable main tuning shaft rotation of which is effective selectively to receive signals from all television stations in the UHF television band, a selector shaft, a knob on said selector shaft which is arranged to be grasped by the operator and rotated, said selector shaft being postioned in offset relation to said main tuning shaft, bearing means engaging said selector shaft at spaced points therealong for permitting rotation of said selector shaft while preventing tilting thereof, a detent wheel positioned on and secured to said selector shaft and having a plurality of notches in the periphery thereof, spring biased detent means adapted to engage different ones of said notches as said slector shaft is rotated, thereby to eastablish a plurality of detent positons for said selector shaft, means including a plurality of gears for coupling said selector shaft to said main tuning shaft so that said main tuning shaft is moved to different positions established by said detent wheel in response to rotation of said selector shaft, a fine tuning shaft concentric with said selectro shaft, a fine tuning knob on said fine tuning shaft which is arranged to be grasped by the operator to effect a fine tuning operation, and means coupling said fine tuning shaft to said main tuning shaft independently of said detent wheel, whereby rotation of said fine tuning member is effective to move said main tuning shaft without changing the dented position of said selector shaft and while maintaining the axes of rotation of said plurality of gears in parallel relationship.

47. The combination of claim 46, wherein said concentric fine tuning member is positioned outside said selector shaft.

48. In combination, a UHF tuner having a continuously variable main tuning shaft rotation of which is effective selectively to receive signals from all television stations in the UHF television band, a selector shaft, a knob on said selector shaft which is arranged to be grasped by the operator and rotated, said selector shaft being positioned in offset relation to said main tuning shaft, bearing means engaging said selector shaft at spaced points therealong for permitting rotation of said selector shaft while preventing tilting thereof, a detent wheel positioned on and secured to said selector shaft and having a plurality of notches in the periphery thereof, spring biased detent means adapted to engage different ones of said notches as said selector shaft is rotated, thereby to establish a plurality of detent positions for said selector shaft, means including a plurality of gears for interconnecting said detent wheel and said main tuning shaft so that said main tuning shaft is moved to different positions established by said detent wheel in response to rotation of said selector shaft, a fine tuning shaft concentric with said selector shaft, a fine tuning knob on said fine tuning shaft which is arranged to be grasped by the operator to effect a fine tuning operation, and means responsive to rotation of said fine tuning shaft for moving one of said plurality of gears to effect an adjustment of said main tuning shaft without changing the detented position of said selector shaft and while maintaining the axes of rotation of said plurality of gears in parallel relationship.

* * * * *

PO-1050
(5/69)

UNITED STATES PATENT OFFICE
CERTIFICATE OF CORRECTION

Patent No. 3,757,227 Dated September 4, 1973

Inventor(s) Morton L. Weigel

It is certified that error appears in the above-identified patent and that said Letters Patent are hereby corrected as shown below:

Title page, line 3, after "Assignee:" the words "Sarkes Tragian" should read --Sarkes Tarzian--;
Column 29, line 32, "tuner" should read --tuned--;
line 68, after "comprising" insert --a--;
Column 33, line 58, "37" should read --39--;
Column 34, line 16, "group" should read --groups--;
Column 35, line 28, "slector" should read --selector--;
line 29, "eastablish" should read --establish--;
line 30, "positons" should read --positions--;
line 35, "selectro" should read --selector--;
Column 36, line 3, "dented" should read --detented--.

Signed and sealed this 29th day of January 1974.

(SEAL)
Attest:

EDWARD M.FLETCHER,JR.
Attesting Officer

RENE D. TEGTMEYER
Acting Commissioner of Patents